US009477379B2

(12) United States Patent
Utsuki et al.

(10) Patent No.: US 9,477,379 B2
(45) Date of Patent: Oct. 25, 2016

(54) INFORMATION PROCESSING APPARATUS, DISPLAY METHOD, AND DISPLAY PROGRAM

(71) Applicant: SONY CORPORATION, Tokyo (JP)

(72) Inventors: Shingo Utsuki, Kanagawa (JP); Kazuhiro Hara, Tokyo (JP)

(73) Assignee: Sony Corporation, Tokyo (JP)

( * ) Notice: Subject to any disclaimer, the term of this patent is extended or adjusted under 35 U.S.C. 154(b) by 493 days.

(21) Appl. No.: 13/961,732

(22) Filed: Aug. 7, 2013

(65) Prior Publication Data

US 2013/0326418 A1  Dec. 5, 2013

Related U.S. Application Data

(63) Continuation of application No. 12/859,038, filed on Aug. 18, 2010, now Pat. No. 8,539,376.

(30) Foreign Application Priority Data

Aug. 31, 2009  (JP) .................................. 2009200161

(51) Int. Cl.
G06F 15/177  (2006.01)
G06F 3/0482  (2013.01)
G06F 3/0481  (2013.01)
H04M 1/725  (2006.01)

(52) U.S. Cl.
CPC ......... G06F 3/0482 (2013.01); G06F 3/04817 (2013.01); H04M 1/72547 (2013.01); H04M 1/72561 (2013.01); H04M 1/72583 (2013.01)

(58) Field of Classification Search
CPC . G06F 3/04817; G06F 3/0482; G06F 3/0484
See application file for complete search history.

(56) References Cited

U.S. PATENT DOCUMENTS

| 7,242,498 | B2 * | 7/2007 | Fujiwara | .............. G06Q 10/107 |
| | | | | 715/764 |
| 7,386,796 | B1 | 6/2008 | Simpson et al. | |
| 7,992,103 | B2 | 8/2011 | Gusmorino et al. | |
| 8,140,993 | B2 | 3/2012 | Balasubramanian | |
| 8,225,225 | B2 | 7/2012 | Jetha et al. | |
| 2006/0101350 | A1* | 5/2006 | Scott | ..................... G06F 3/0481 |
| | | | | 715/779 |
| 2008/0056155 | A1 | 3/2008 | Lahtiranta et al. | |

(Continued)

FOREIGN PATENT DOCUMENTS

| EP | 1 659 766 | 5/2006 |
| JP | 2003-304320 | 10/2003 |
| JP | 2004-102457 | 4/2004 |
| JP | 2006-050463 | 2/2006 |
| JP | 2006-505037 | 2/2006 |
| JP | 2007-129506 | 5/2007 |

(Continued)

OTHER PUBLICATIONS

European Search Report, issued in European Application No. 10173815,1 dated Dec. 3, 2010 (6 pgs.).

*Primary Examiner* — Jeffrey A Gaffin
*Assistant Examiner* — Ayesha Huertas Torres
(74) *Attorney, Agent, or Firm* — Paratus Law Group, PLLC

(57) ABSTRACT

This application discloses systems and methods for receiving information associated with a first set of processing instructions and presenting a second icon indicating a change in status of data associated with the first set of processing instructions. A user selection of one of a first icon or the second icon may then be received. The selection of the first icon may cause execution of the first set of processing instructions, whereas selection of the second icon may cause execution of a second set of processing instructions.

20 Claims, 19 Drawing Sheets

(56) References Cited

U.S. PATENT DOCUMENTS

| | | | |
|---|---|---|---|
| 2009/0227295 A1* | 9/2009 | Kim | G06F 3/016 345/173 |
| 2010/0077347 A1 | 3/2010 | Kirtane et al. | |
| 2010/0190513 A1* | 7/2010 | Andreasson | G06F 17/30241 455/456.3 |

FOREIGN PATENT DOCUMENTS

| | | |
|---|---|---|
| JP | 2007-512635 | 5/2007 |
| JP | 2008-146326 | 6/2008 |
| JP | 2009-500761 | 1/2009 |
| JP | 2009-147837 | 7/2009 |
| JP | 2009-163278 | 7/2009 |

* cited by examiner

INFORMATION PROCESSING APPARATUS, DISPLAY METHOD, AND DISPLAY PROGRAM

This application is a continuation of U.S. patent application Ser. No. 12/859,038, filed Aug. 18, 2010, which is based upon and claims the benefit of priority under 35 U.S.C. §119 to Japanese Application No. 2009-200161 filed in the Japanese patent Office on Aug. 31, 2009, the entire contents of all of which are incorporated herein by reference.

BACKGROUND

1. Technological Field

The present invention relates to an information processing apparatus, a display method, and a display program which are suitably used for displaying an icon for activating an application, for example.

2. Description of the Related Art

Recently, there is a type of information processing apparatus such as a personal computer in which an icon (so-called short-cut) for activating a predetermined application (this will be also referred to as app) is displayed on the desktop screen or the like.

As such information processing apparatus, for example, there has been proposed a type of information processing apparatus in which a short-cut for activating a predetermined function of an app is created on the desktop screen or the like on the basis of a user input (see, for example, Japanese Unexamined Patent Application Publication No. 2004-102457).

As such information processing apparatus, for example, there has been also proposed a type of information processing apparatus in which the number of newly arrived information in an app (for example, newly arrived emails or the like in the case of an email app) is displayed together with an icon for activating the app.

Incidentally, each of the information processing apparatuses described above is configured to display the number of newly arrived information in an app together with an icon for activating the app, thereby making it possible to notify the user that newly arrived information has been acquired in the app.

However, to actually check the contents of newly arrived information in the app, it is necessary for the user to perform an operation of selecting the icon for activating the app via an input section, thereby causing the above-described information processing apparatus to activate the app. Thereafter, it is further necessary for the user to perform a predetermined operation via the input section to display the contents of newly arrived information in the app.

That is, the above-described information processing apparatuses make it necessary for the user to perform cumbersome operations when making the user check information related to a state change in an app, such as the contents of newly arrived information in the app.

SUMMARY

In one embodiment, an information processing apparatus is disclosed. The information processing apparatus may comprise, for example, an input unit configured to receive information associated with a first set of processing instructions. The information processing apparatus may further comprise, for example, a controller configured to: generate a first signal to cause a first icon to be presented on a display; generate a second signal, based on the received information, to cause a second icon to be presented on the display, the second icon indicating a change in status of data associated with the first set of processing instructions; and receive a user selection of one of the first or second icons, selection of the first icon causing execution of the first set of processing instructions, and selection of the second icon causing execution of a second set of processing instructions.

DESCRIPTION OF THE EMBODIMENTS

Several embodiments are described below. The description will be given in the following order of topics.

1. First Embodiment (example with two display sections)
2. Second Embodiment (example with one display section)
3. Other Embodiments

1. First Embodiment

1-1. Overview of First Embodiment

First, an overview of the first embodiment will be described. After describing this overview, the description will move on to a specific example of this embodiment.

Figure 1:
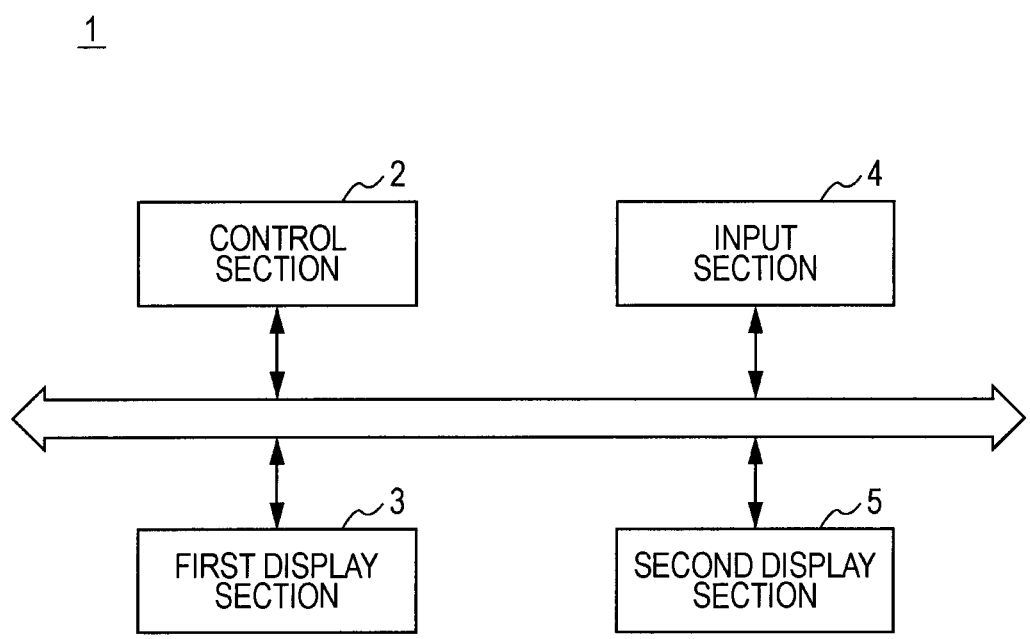
FIG. 1 is a functional block diagram showing an overview of a first embodiment.

In FIG. 1, reference numeral 1 denotes an information processing apparatus. The information processing apparatus 1 has a control section 2. The control section 2 is configured to display on a first display section 3 a first icon for activating a predetermined application.

In addition, upon detecting a state change (i.e., a change in status) in the application, the control section 2 is configured to display on the first display section 3 a second icon for indicating the state change and displaying information related to the state change.

Further, the control section 2 is configured to display information related to the state change on a second display section 5 when the second icon is selected via an input section 4. The control section 2 may comprise a controller, such as a computer, processor and memory, etc.

The above-described configuration makes it possible for the information processing apparatus 1 to notify the user of a state change in a predetermined application. At the same time, the information processing apparatus 1 allows the user to check information related to the state change by merely making the user perform a simple operation of selecting the second icon via the input section 4.

A specific example of the information processing apparatus 1 configured as described above will be described in detail below.

1-2. Exterior Configuration of Portable Terminal

Figure 2:
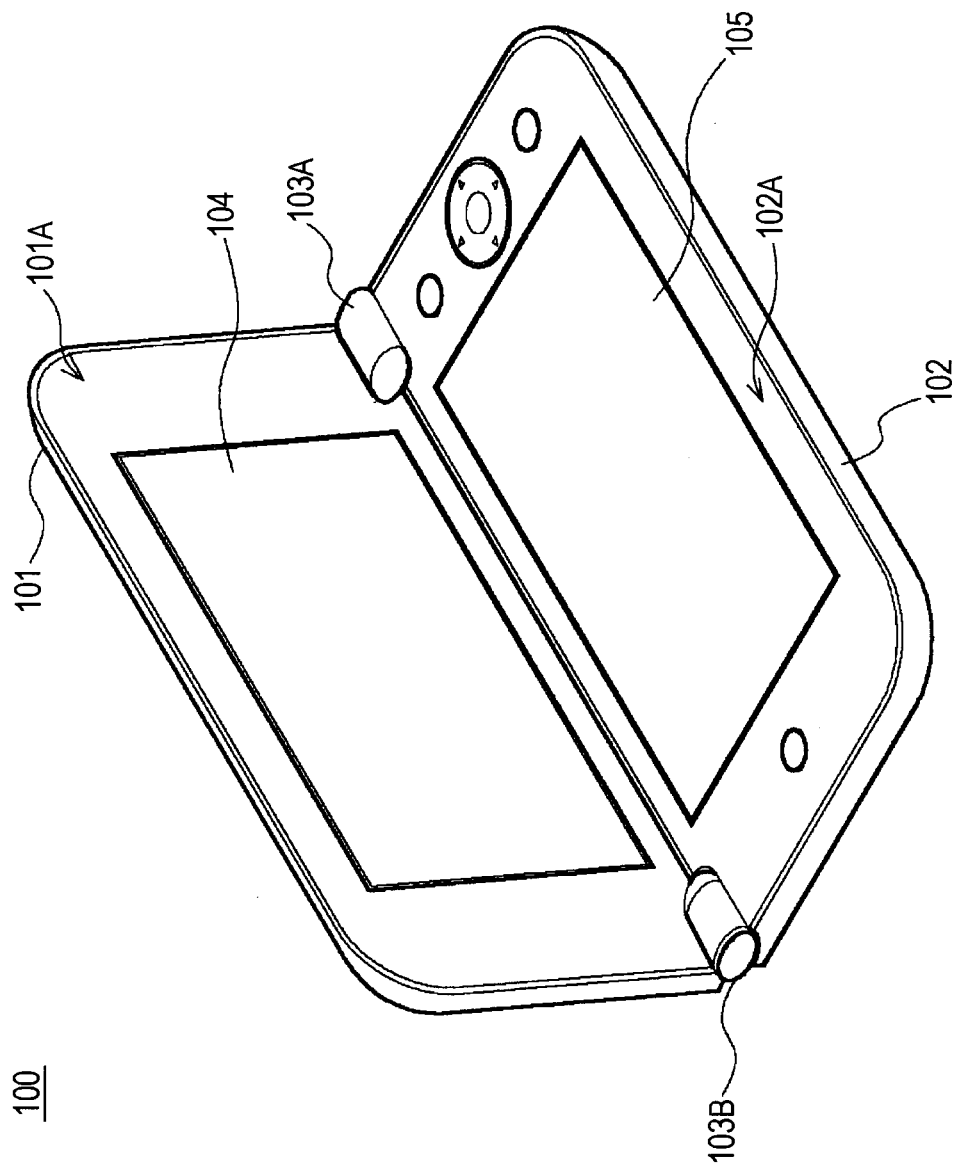
FIG. 2 is a schematic diagram showing the exterior configuration of a portable terminal according to the first embodiment.

Next, referring to FIG. 2, a description will be given of the exterior configuration of a portable terminal 100 representing a specific example of the information processing apparatus 1 described above.

In the portable terminal 100, a first casing 101 and a second casing 102 are rotatably coupled to each other by, for example, coupling sections 103A and 103B such as hinges so as to separate from or approach each other, and are electrically connected to each other.

Each of the first casing 101 and the second casing 102 has a substantially flat rectangular shape of such a size that allows it to be held in one hand.

A first touch screen 104 having a rectangular shape is provided at the central portion of a front surface 101A of the first casing 101. A second touch screen 105 of the same shape and size as the first touch screen 104 is provided at the central portion of a front surface 102A of the second casing 102.

The first touch screen 104 and the second touch screen 105 are each a display device allowing a touch operation with a user's finger (a pen or the like may be also used). In the portable terminal 100, for example, the first touch screen 104 and the second touch screen 105 are used by the user as an upper screen and a lower screen, respectively.

Various hardware buttons are provided on both sides of the second touch screen 105.

1-3. Hardware Configuration of Portable Terminal

Next, referring to FIG. 3, the hardware configuration of the portable terminal 100 will be described. In the portable terminal 100, a CPU 120, a ROM 121, and a RAM 122 are connected via a host bus 123. Incidentally, the term CPU is an abbreviation of Central Processing Unit. In addition, the term ROM is an abbreviation of Read Only Memory, and the term RAM is an abbreviation of Random Access Memory.

The portable terminal 100 is configured to execute various kinds of processing as the CPU 120 loads various programs such as a basic program (OS) and applications (apps) written in the ROM 121 or the like into the RAM 122 and executes these programs. Incidentally, the term OS is an abbreviation of Operating System. In addition, an application refers to a piece of software that realizes a function in the portable terminal 100.

The host bus 123 is connected to an external bus 125 via a bridge 124. The external bus 125 is connected to an operating section 127, a first liquid crystal panel 104A, a first touch panel 104B, a second liquid crystal panel 105A, and a second touch panel 105B via an interface 126. The external bus 125 is also connected to a storage section 128, a drive 129, a connection port 130, and a wireless communication section 131 via the interface 126.

The CPU 120 is configured to control individual sections in response to input signals from the first touch panel 104B, the second touch panel 105B, and the operating section 127 which are sequentially sent via the interface 126, the external bus 125, and the host bus 123.

The first touch panel 104B is a device constituting the first touch screen 104 described above together with the first liquid crystal panel 104A. The second touch panel 105B is a device constituting the second touch screen 105 described above together with the second liquid crystal panel 105A.

When an arbitrary position on the first touch panel 104B is touched with a finger, the first touch panel 104B detects the coordinates of the touched position (i.e., the touch position), and sends an input signal indicating the coordinates of this touch position to the CPU 120.

Upon acquiring the coordinates of the touch position from the input signal sent from the first touch panel 104B, the CPU 120 translates the coordinates into screen coordinates of the first liquid crystal panel 104A, thereby recognizing which position on the screen of the first liquid crystal panel 104A has been touched.

Then, by sequentially translating the coordinates of the touch position acquired from an input signal sent every predetermined period of time into screen coordinates of the first liquid crystal panel 104A, the CPU 120 recognizes how the touch position has moved (i.e., the trajectory of the touch position).

Then, on the basis of the touch position and its trajectory recognized in this way, the CPU 120 is configured to determine what kind of touch operation has been made to which position on the screen of the first liquid crystal panel 104A.

Likewise, the second touch panel 105B also sends an input signal indicating the coordinates of a detected touch position to the CPU 120. From the input signal, the CPU 120 is configured to determine what kind of touch operation has been made to which position on the screen of the second liquid crystal panel 105A.

The operating section 127 is a device made up of various hardware buttons, and sends an input signal responsive to an operation on each of these hardware buttons to the CPU 120. The CPU 120 is configured to determine which hardware button has been operated, on the basis of such an input signal sent from the operating section 127.

In addition, the CPU 120 is configured to directly communicate with a nearby external apparatus OC through inter-equipment communication with the external apparatus OC via the connecting port 130.

In addition, the CPU 120 is configured to communicate with another apparatus such as a server on the Internet NT, by connecting to the Internet NT via an access point by the wireless communication section 130.

In addition, when the CPU 120 acquires, for example, content data (moving image data, music data, and the like) as a result of communication with another apparatus via the connecting port 130 or the wireless communication section 131, the CPU 120 stores this content data into the storage section 128. It should be noted that when a removable recording medium RW (for example, an optical disc or a flash memory) is inserted in the drive 129, the CPU 120 is configured to store content data onto the removable recording medium RW in response to a user's operation.

1-4. Home Screen

Next, a description will be given of a home screen which is one of screens of the portable terminal 100. The home screen is a GUI (Graphical User Interface) screen displayed by a display control performed by the CPU 120.

Figure 4:
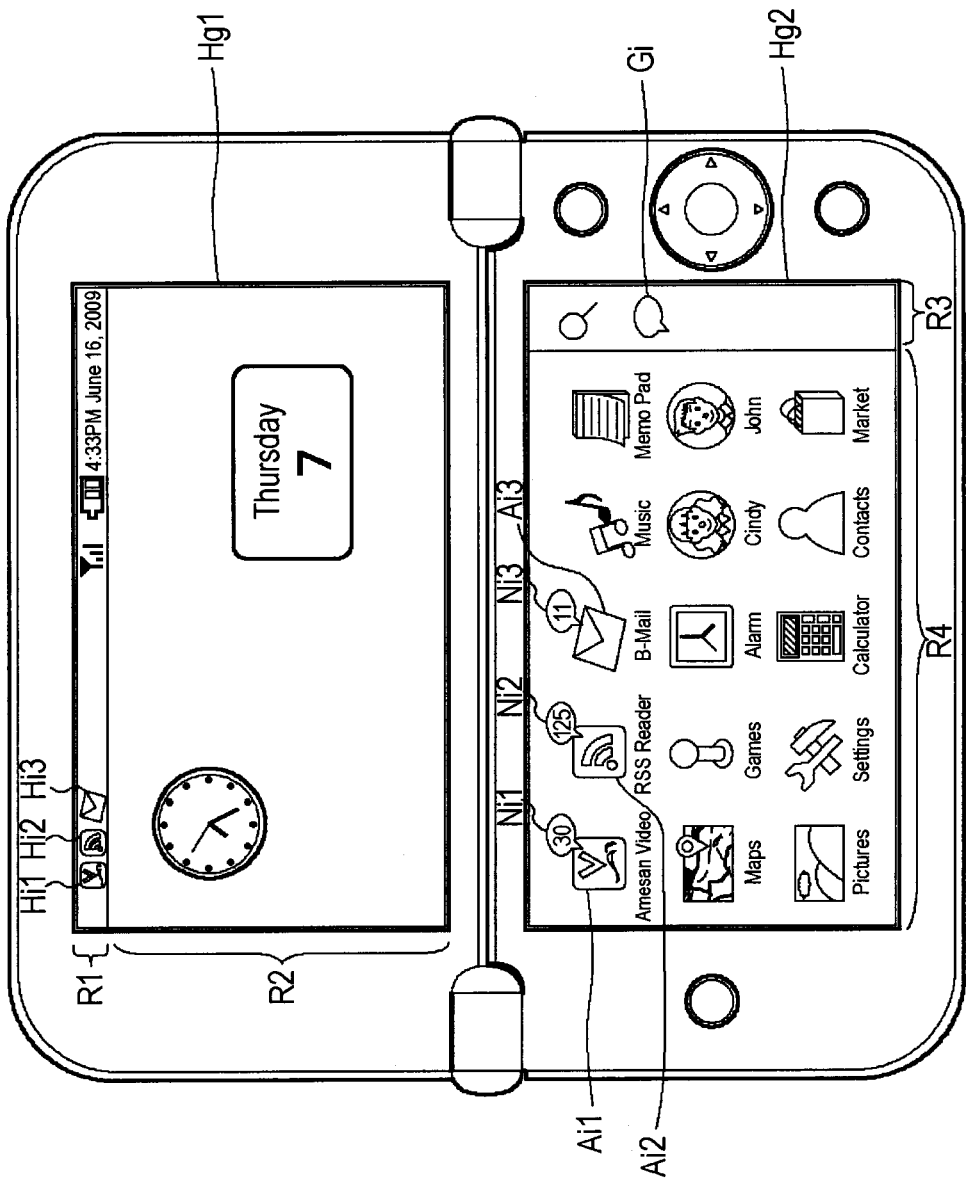
FIG. 4 is a schematic diagram used for explaining a home screen (1)

When a power button (not shown) is depressed and the power of the portable terminal 100 is turned on, as shown in FIG. 4, the CPU 120 causes a first home screen Hg1 to be displayed on the first liquid crystal panel 104A as a home screen. At the same time, the CPU 120 causes a second home screen Hg2 to be displayed on the second liquid crystal panel 105A as a home screen.

The first home screen Hg1 includes a region R1 of a laterally elongated narrow strip-like shape placed along the top side of the screen, and a region R2 other than the region R1. In the region R1, for example, icons Hi (Hi1 to Hi3) indicating apps which are set to display new arrivals icons Ni described later, icons indicating states of the portable terminal 100 (such as the remaining battery charge, the field strength of wireless communication, and the like), and the like are displayed. On the other hand, in the region R2, a window corresponding to the currently active app, icons corresponding to widgets (for example, widgets having a clock function and calendar function) are displayed.

A second home screen Hg2 includes a region R3 of a longitudinally elongated narrow stripe-like shape placed along the right side of the screen, and a region R4 other than the region R3. In the region R3, a pop-up type overview icon Gi (described later) and the like are displayed.

In the region R4, a plurality of app icons Ai (Ai1 to Ain) for activating predetermined apps (i.e., sets of processing instructions) are displayed in matrix arrangement. The name of an app corresponding to each app icon Ai is displayed under the corresponding app icon Ai.

On the second home screen Hg2 shown in FIG. 4, for example, an app icon Ai1 for activating an app having a moving image (i.e., video) purchase and download function (hereinafter, this will be also referred to as video purchase app) is displayed at the top left. An app icon Ai2 for activating an RSS (RDF Site Summary/Rich Site Summary) reader is displayed on the right next to the app icon Ai1. An app icon Ai3 for activating an email app is displayed on the right next to the app icon Ai2.

When a tap operation (an operation of touching the touch panel with a finger and then immediately releasing the finger) is performed on an app icon Ai by the user via the second touch panel 105B, the CPU 120 recognizes that the app icon Ai has been selected.

Then, the CPU 120 activates an app corresponding to the app icon Ai, and displays the top screen (the screen normally set to be displayed initially) of the app instead of the home screen. Hereinafter, such activation of an app will be also referred to as activation of an app under normal setting.

On the second home screen Hg2, upon acquisition of newly arrived information in individual apps (i.e., a change in status), new arrivals icons Ni (Ni1 to Nin) each indicating the number of newly arrived information are displayed. Each of the new arrivals icons Ni is the same pop-up type icon as the overview icon Gi, and is displayed on the upper right of the corresponding app icon Ai in such a way that the new arrivals icon Ni partially overlaps the app icon Ai.

For example, displayed on the upper right of the app icon Ai1 for activating a video purchase app is a new arrivals icon Ni1 indicating, as the number of newly arrived information, the total number of newly arrived videos that can be purchased through the video purchase app.

Displayed on the upper right of the app icon Ai2 for activating an RSS reader is a new arrivals icon Ni2 indicating, as the number of newly arrived information, the total number of Web site update information set in the RSS reader in advance.

Displayed on the upper right of the app icon Ai3 for activating an email app is a new arrivals icon Ni3 indicating, as the number of newly arrived information, the total number of newly arrived emails addressed to the portable terminal 100.

Figure 5:
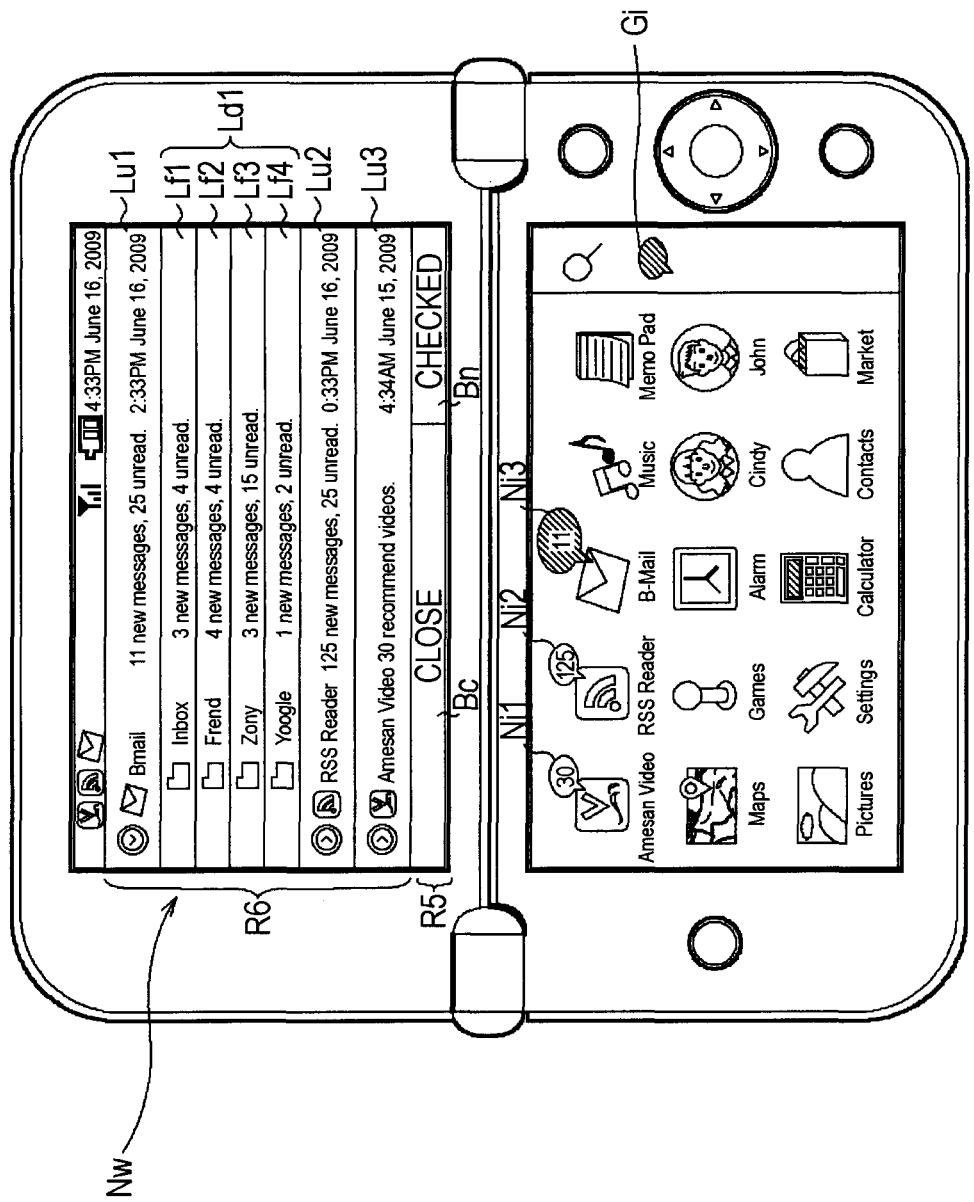
FIG. 5 is a schematic diagram used for explaining a home screen (2)

Now, suppose that a tap operation is performed on, for example, the new arrivals icon Ni3 (corresponding to an email app) via the second touch panel 105B. Then, the CPU 120 recognizes that the new arrivals icon Ni3 has been selected and, as shown in FIG. 5, changes the color of the new arrivals icon Ni3 and also displays the new arrivals icon Ni3 in one size larger than previously displayed.

At this time, the CPU 120 does not activate the email app corresponding to the new arrivals icon Ni3 but activates a program for displaying information showing an overview of newly arrived information in each app (this will be also referred to as new arrivals overview information). It should be noted that this program will be also referred to as new arrivals overview display program. Then, the CPU 120 displays a window (this will be also referred to as new arrivals overview window) Nw for displaying new arrivals overview information for each app, on the entirety of the region R2 of the first home screen Hg1.

In should be noted that this function of displaying new arrivals overview information for each app may be a function included in the OS of the portable terminal 100, for example. Also, for example, a program having this function may be installed into the portable terminal 100 to thereby realize the function.

The new arrivals overview window Nw includes a region R5 of a laterally elongated narrow strip-like shape placed along the bottom side of the new arrivals overview window Nw, and a region R6 other than the region R5. Displayed in the region R5 is a Close button Bc for terminating the activation of the new arrivals overview display program and closing the new arrivals overview window Nw. Also displayed in the region R5 is a Checked button Bn for setting new arrivals overview information as having been already checked by the user. This Checked button Bn will be described later in detail.

Displayed in the region R6 is new arrivals overview information hierarchically structured on an app-by-app basis. This new arrivals overview information includes, for example, upper-level rows Lu (Lu1 to Lu3) each indicating the kind, total number, and the like of newly arrived information in each app as the upper level, and lower-level rows Ld (Ld1 to Ld3) each indicating the details of new arrivals overview information in each app as the lower level. The upper-level rows Lu and the lower-level rows Ld have a laterally elongated narrow strip-like shape. In the region R6, a number of upper-level rows Lu and lower-level rows Ld that can be displayed within the region R6 are displayed.

Specifically, the CPU 120 displays at the top of the region R6 an upper-level row Lu1 for an app (email app in this example) corresponding to the new arrivals icon Ni3 that has been selected. In this upper-level row Lu1, the name of the email app, the total number of newly arrived emails, the total number of unread emails, the date and time of acquisition of newly arrived emails, and the like are displayed. It should be noted that unread emails refer to those emails which have been checked by the user as newly arrived emails (i.e., set by the user as having been already checked with the Checked button Bn) but have not yet been read on the email app.

The CPU 120 displays, under the upper-level row Lu1 for the email app, a lower-level row Ld1 for an app (i.e., email app) corresponding to the selected new arrivals icon Ni. In this lower-level row Ld1, folder rows Lf (Lf1 to Lf4) each indicating the number of newly arrived emails and the number of unread emails for every folder set in the email app are displayed. It should be noted that in this case, received emails are distributed over individual folders (for example, folders for individual senders or the like) in the email app.

The CPU 120 displays an upper-level row Lu2 for the RSS reader under the lower-level row Ld1 for the email app. In this upper-level row Lu2, the total number of update information, the total number of unread information, the date and time of acquisition of update information, and the like for a Web site set in the RSS reader are displayed. This unread information refers to information that has been checked by the user as update information (i.e., set by the user as having been already checked with the Checked button Bn) but has not yet been read by the RSS reader.

The CPU 120 displays an upper-level row Lu3 for the video purchase app under the upper-level row Lu2 for the RSS reader. In this upper-level row Lu3, the name of the video purchase app, the total number of newly arrived videos that can be purchased through the video purchase app, the date and time of acquisition of newly arrived video information, and the like are displayed.

It should be noted that at this time, no lower-level rows Ld are displayed for apps (the video purchase app and the RSS reader in this example) corresponding to unselected new arrivals icons Ni.

In this way, when a new arrivals icon Ni is selected, the CPU 120 displays the new arrivals overview window Nw to display upper-level rows Lu for a plurality of apps, thereby allowing the user to check new arrivals overview information for the plurality of apps at once.

In addition, the CPU 120 displays a lower-level row Ld for an app corresponding to the selected new arrivals icon Ni in this way, thereby allowing the user to check the details of new arrivals overview information for the app.

Figure 6:
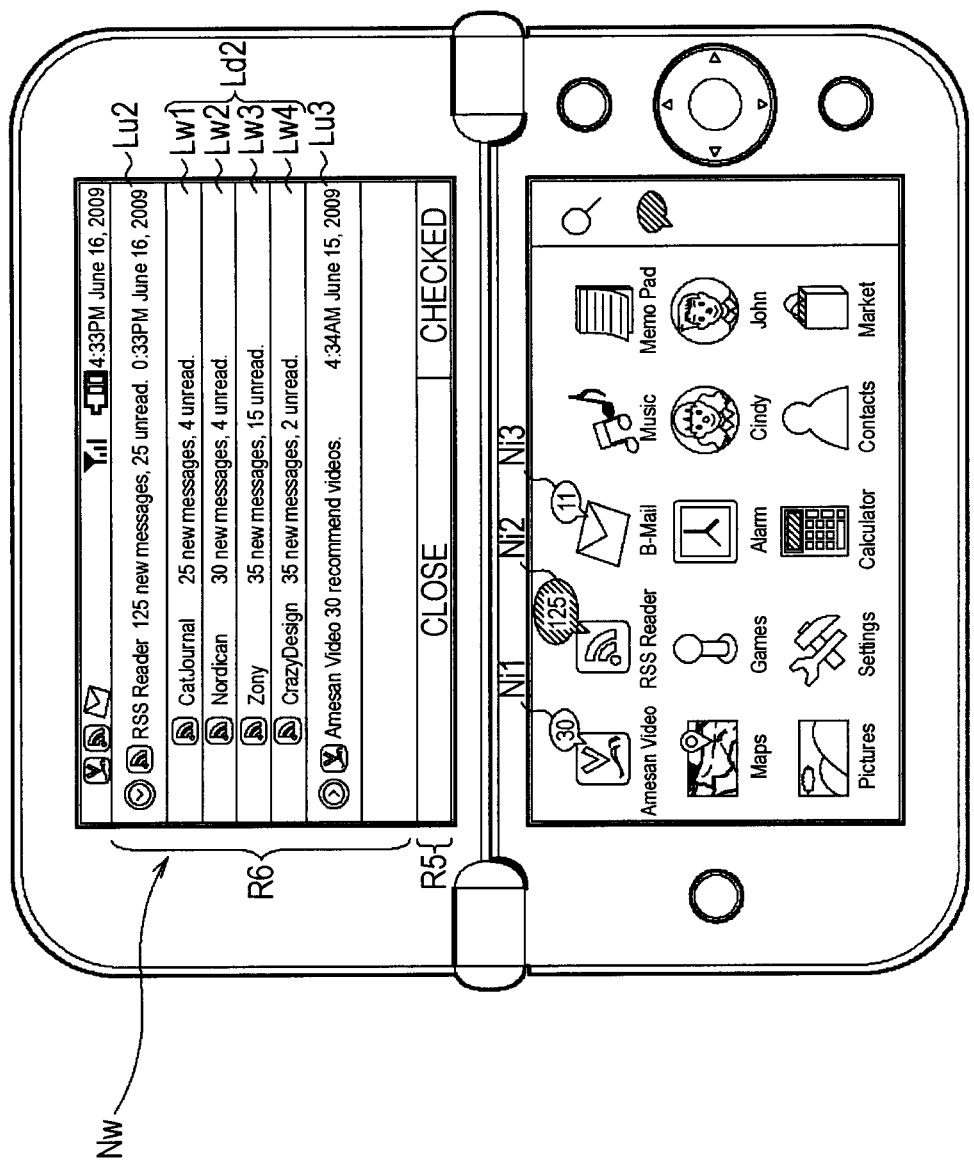
FIG. 6 is a schematic diagram used for explaining a home screen (3)

Now, suppose that, for example, a tap operation is performed on the new arrivals icon Ni2 corresponding to the RSS reader in a state with the new arrivals overview window Nw displayed in this way. Then, the CPU 120 recognizes that the new arrivals icon Ni2 has been selected and, as shown in FIG. 6, changes the color of the new arrivals icon Ni2 and also displays the new arrivals icon Ni2 in one size larger than previously displayed. In addition, the CPU 120 deselects the new arrivals icon Ni3 that has been selected up to then, and displays the new arrivals icon Ni3 after returning its color and size to the original.

At this time, the CPU 120 closes the lower-level row Ld1 for an app (email app in this example) corresponding to the new arrivals icon Ni3 that has been deselected. Then, the CPU 120 causes the upper-level rows Lu (Lu1 to Lu3) to be scrolled from bottom to top so that the upper-level row Lu2 for an app (RSS reader in this example) corresponding to the selected new arrivals icon Ni2 comes at the top of the region R6.

Then, the CPU 120 displays the lower-level row Ld2 for the RSS reader immediately under the upper-level row Lu2 for the RSS reader. Displayed in this lower-level row Ld2 are Web site rows Lw (Lw1 to Lw4) each indicating the number of update information and the number of unread information for each Web site set in the RSS reader.

In this way, when the new arrivals icon Ni2 corresponding to the RSS reader is selected, the portable terminal 100 displays the lower-level row Ld2 for the RSS reader on the new arrivals overview window Nw. Thus, the portable terminal 100 allows the user to check the details of new arrivals overview information for the RSS reader.

Now, suppose that in a state with the new arrivals overview window Nw displayed in this way, further, a tap operation is performed on the new arrivals icon Ni1 corresponding to the video purchase app. Then, the CPU 120 recognizes that the new arrivals icon Ni1 has been selected, and deselects the new arrivals icon Ni2 that has been selected up to then.

Figure 7:
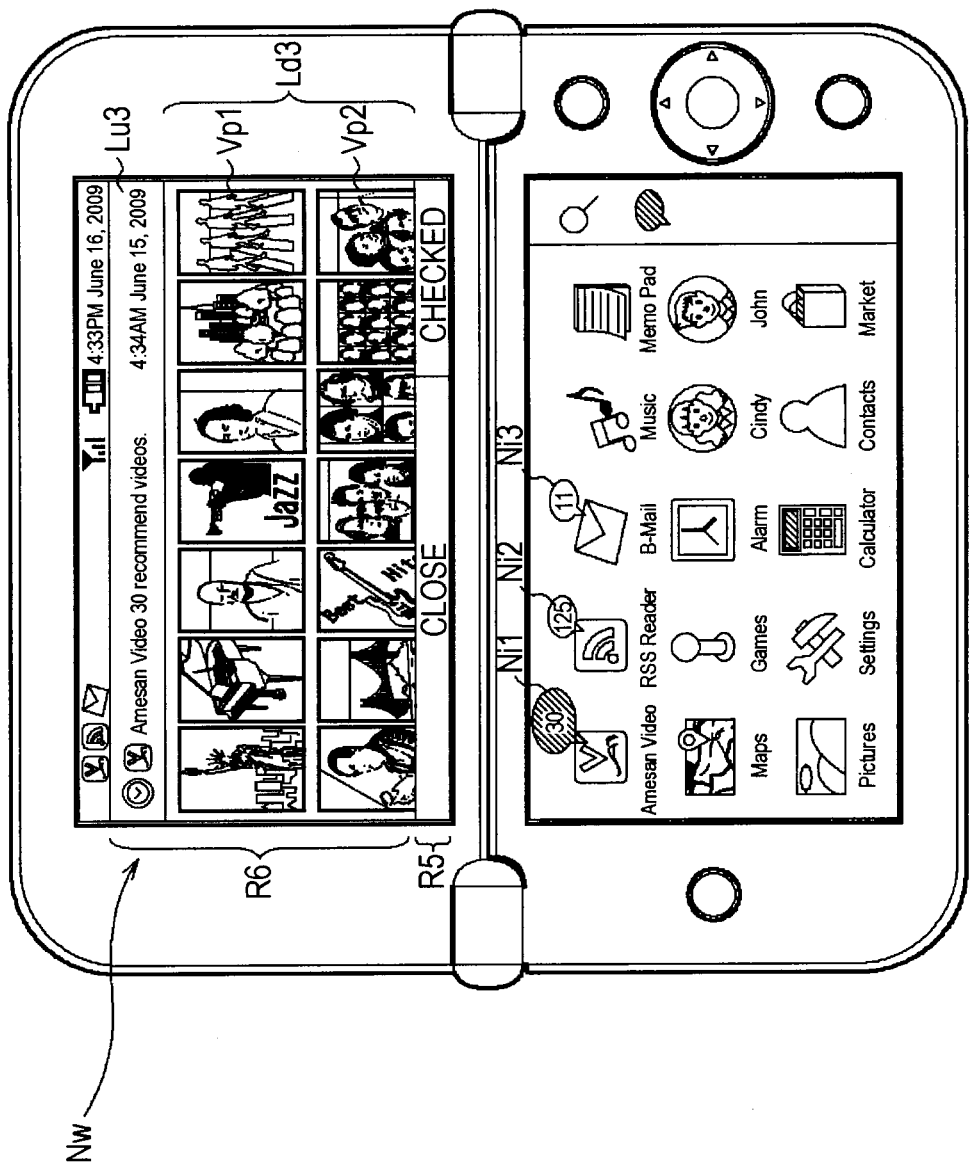
FIG. 7 is a schematic diagram used for explaining a home screen (4)

Then, as shown in FIG. 7, the CPU 120 closes the lower-level row Ld2 for the RSS reader corresponding to the new arrivals icon Ni2 that has been deselected. Then, the CPU 120 causes the upper-level rows Lu to be scrolled from bottom to top so that the upper-level row Lu3 for the video purchase app corresponding to the selected new arrivals icon Ni1 comes at the top of the region R6.

Then, the CPU 120 displays the lower-level row Ld3 for the video purchase app immediately under the upper-level row Lu3 for the video purchase app. In this lower-level row Ld3, as new arrivals overview information for the video purchase app, jacket photograph images Vp (Vp1 to Vpn) of individual newly arrived videos in the video purchase app are displayed in matrix arrangement.

In this way, when the new arrivals icon Ni1 corresponding to the video purchase app is selected, the portable terminal 100 displays the lower-level row Ld3 for the video purchase app on the new arrivals overview window Nw. Thus, the portable terminal 100 allows the user to check the details of new arrivals overview information for the video purchase app.

It should be noted that as for the jacket photograph images Vp, a number of jacket photograph images Vp that can be displayed within the lower-level row Ld3 are displayed. When a drag operation is performed on this lower-level row Ld3 in the up/down direction via the first touch panel 104B, the CPU 120 causes the jacket photograph images Vp to be scrolled in response to the drag operation. Incidentally, a drag operation refers to an operation of moving a finger while keeping the finger touching the touch panel.

Suppose that a double tap operation (operation of performing a tap twice successively) on an arbitrary jacket photograph image Vp is performed via the first touch panel 104B. Then, the CPU 120 recognizes that the jacket photograph image Vp has been selected, and activates the video purchase app.

Figure 8:
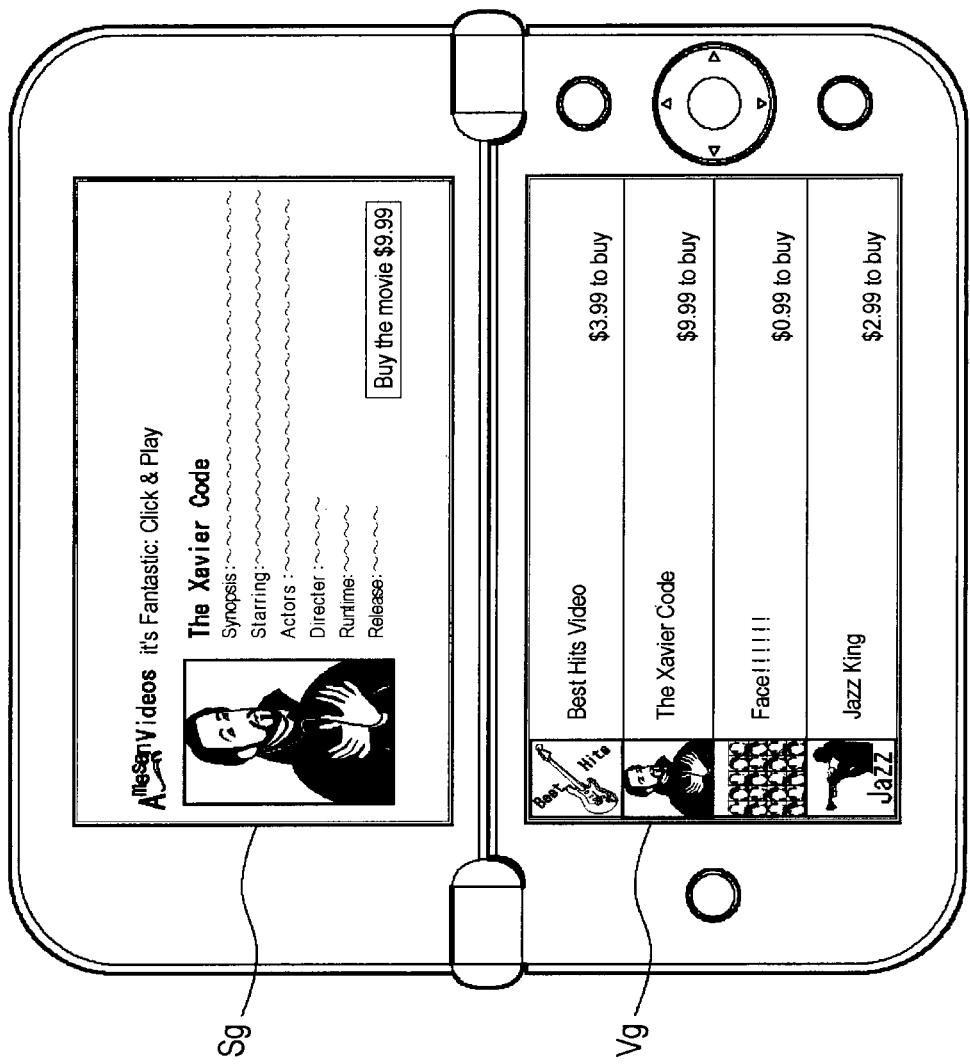
FIG. 8 is a schematic diagram used for explaining a screen in a video purchase app.

At this time, as shown in FIG. 8, the CPU 120 displays not the top screen of the video purchase app but a sales page screen Sg for the video indicated by the selected jacket photograph image Vp on the first liquid crystal panel 104A. At the same time, the CPU 120 displays a list screen Vg showing a list of the title names, sales prices, and the like of newly arrived videos on the second liquid crystal panel 105A.

That is, when a jacket photograph image Vp in the lower-level row Ld3 is selected, the CPU 120 activates the video purchase app. At this time, the CPU 120 initially displays not the top screen of the video purchase app but a screen showing various information related to newly arrived videos.

It should be noted that likewise, when a double tap operation is performed on an arbitrary folder row Lf (FIG. 5) in the lower-level row Ld1 for the email app, the CPU 120 recognizes that the folder row Lf has been selected, and activates the email app. At this time, the CPU 120 initially displays not the top screen of the email app but a screen showing a list of newly arrived emails stored in the folder corresponding to the selected folder row Lf.

Likewise, when a double tap operation is performed on an arbitrary Web site row Lw (FIG. 6) in the lower-level row Ld2 for the RSS reader, the CPU 120 recognizes that the Web site row Lw has been selected, and activates the RSS reader. At this time, the CPU 120 initially displays not the top screen of the RSS reader but a screen showing a list of newly arrived information for the Web site corresponding to the selected Web site row Lw.

In this way, when a lower-level row Ld on the new arrivals overview window Nw is selected, unlike the activation of an app under normal setting described above, the CPU 120 activates an app under a setting that initially displays a screen showing information related to newly arrived information.

Incidentally, when an upper-level row Lu on the new arrivals overview window Nw is selected by a double tap operation, if a lower-level row Ld for an app corresponding to the upper-level row Lu is not displayed, the CPU 120 is configured to display the lower-level row Ld.

In addition, when a drag operation in the up/down direction is performed on the new arrivals overview window Nw, the CPU 120 is configured to scroll through upper-level rows Lu and lower-level rows Ld on the new arrivals overview window Nw in response to the drag operation.

In addition, when the new arrivals overview window Nw is being displayed, the CPU 120 is configured to display the overview icon Gi (FIG. 5) described above while changing its color. Then, the CPU 120 is configured to close the new arrivals overview window Nw when a tap operation is performed on the overview icon Gi whose color has changed.

Incidentally, the CPU 120 is configured to hold a new arrivals overview information database for managing new arrivals overview information for each of the apps described above by storing the new arrivals overview information database in the storage section 128. New arrivals overview information is registered in this new arrivals overview information database for each app.

The CPU 120 is configured to read the total number of newly arrived information from the new arrivals overview information database for display in the form of the new arrivals icon Ni, or to read new arrivals overview information from the new arrivals overview information database for display in the form of the new arrivals overview window Nw.

When a tap operation is performed on the Checked button Bn (FIG. 5) on the new arrivals overview window Nw, the CPU 120 recognizes that the user has checked new arrivals overview information for an app (email app in FIG. 5) corresponding to the currently selected new arrivals icon Ni.

Then, the CPU 120 sets the new arrivals overview information for the app as having been already checked by the user, and deletes the new arrivals overview information for the app from the new arrivals overview information database. At the same time, the CPU 120 is configured to make the new arrivals icon Ni corresponding to the app invisible.

It should be noted that when newly arrived information is checked by the user on the currently active app, the CPU 120 is configured to set the newly arrived information as having been already checked by the user, and update the total number of newly arrived information or the like registered in the new arrivals overview information database.

Incidentally, the CPU 120 of the portable terminal 100 is the hardware implementing the function of the control section 2 of the information processing apparatus 1 described in the overview. In addition, the first liquid crystal panel 104A of the portable terminal 100 is the hardware implementing the function of the second display section 5 of the information processing apparatus 1. Further, the second liquid crystal panel 105A of the portable terminal 100 is the hardware implementing the function of the first display section 3 of the information processing apparatus 1. Furthermore, the second touch panel 105B of the portable terminal 100 is the hardware implementing the function of the input section 4 of the information processing apparatus 1.

In addition, the app icon Ai is the icon corresponding to the first icon described in the overview, and the new arrivals icon Ni is the icon corresponding to the second icon described in the overview.

1-5. Operation Procedure

As described above, the portable terminal 100 is configured to display an app icon Ai for activating a predetermined app, and a new arrivals icon Ni indicating the total number of newly arrived information for the app. Then, when the new arrivals icon Ni is selected, the portable terminal 100 is configured to display the new arrivals overview window Nw showing new arrivals overview information for the app.

Hereinbelow, a detailed description will be given of an operation procedure for the series of processing related to a new arrivals icon Ni described above.

[1-5-1. New Arrivals Overview Information Registration Procedure]

First, a description will be given of the operation procedure when the portable terminal 100 registers new arrivals overview information for each app into the new arrivals overview information database (this will be also referred to as new arrivals overview information registration procedure).

This new arrivals overview information registration procedure is a procedure executed by the CPU 120 in accordance with a program written in the ROM 121 or the storage section 128.

Figure 9:
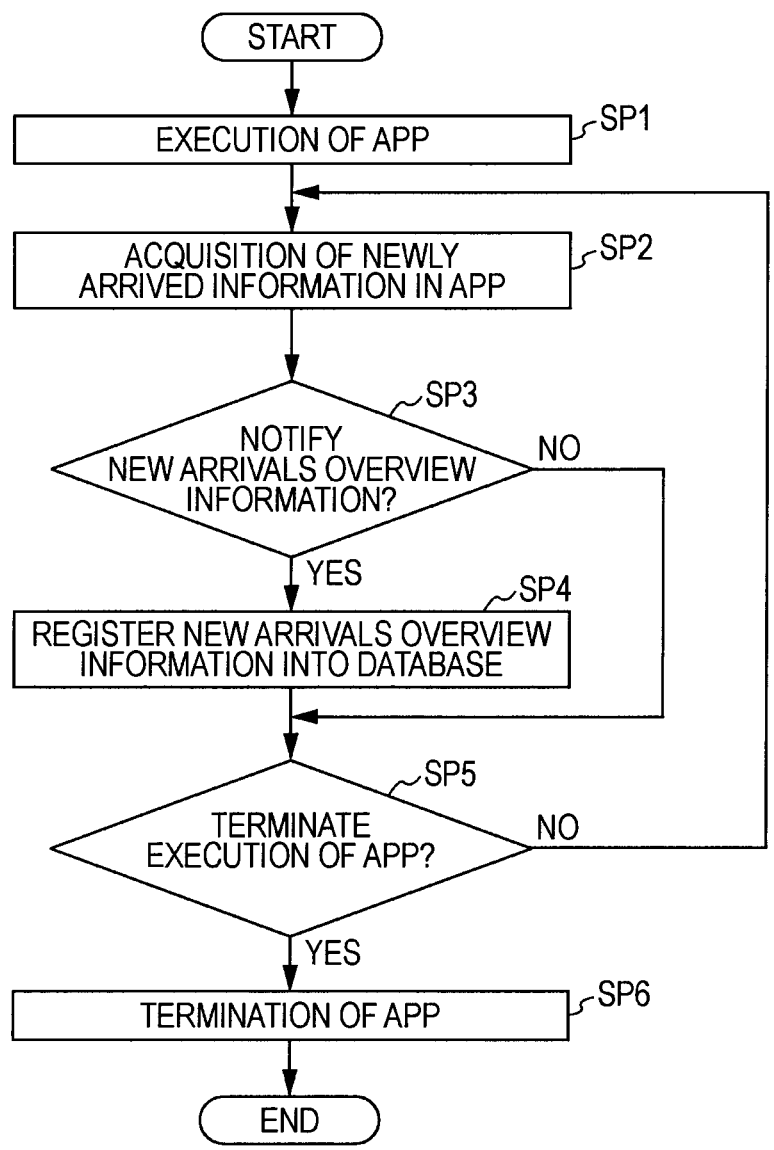
FIG. 9 is a flowchart showing a new arrivals overview information registration procedure.

A new arrivals overview information registration procedure RT1 is executed on an app-by-app basis for every app that is set to display a new arrivals icon Ni. Hereinbelow, for example, the new arrivals overview information registration procedure RT1 for an email app will be described with reference to FIG. 9.

The CPU 120 starts the new arrivals overview information registration procedure RT1 when the power of the portable terminal 100 is turned on, for example, and then transfers to step SP1.

In step SP1, the CPU 120 performs a process of executing an email app in the background, and transfers to the next step SP2. Unlike the process of activating an email app under normal setting described above, this process of executing an email app in the background is configured so that a GUI screen such as the top screen of the email app is not displayed.

In step SP2, the CPU 120 executes a process of acquiring newly arrived information (i.e., newly arrived emails) for the email app.

Specifically, the CPU 120 transmits to an email server (not shown) on the network an acquisition request for acquiring newly arrived emails addressed to the portable terminal 100, via the wireless communication section 131. As a result, the CPU 120 receives newly arrived emails addressed to the portable terminal 100 via the wireless communication section 131.

In step SP3, the CPU 120 determines whether or not to notify the user of new arrivals overview information for the email app. For example, at this time, if newly arrived emails have not been successfully received via the wireless communication section 131, the CPU 120 determines not to notify the user of new arrivals overview information for the email app.

If a positive result is obtained in this step SP3, then the CPU 120 transfers to the next step SP4.

In step SP4, the CPU 120 acquires the total number of newly arrived emails. Specifically, if new arrivals overview information for the email app is currently registered in the new arrivals overview information database (i.e., if the new arrivals overview information has not been deleted with the Checked button Bn or the like), the CPU 120 reads the registered total number of newly arrived emails. Then, the CPU 120 acquires the sum of the registered total number of newly arrived emails and the number of newly arrived emails received at this time, as the total number of newly arrived emails.

It should be noted that if new arrivals overview information for the email app is not registered in the new arrivals overview information database, the CPU 120 acquires the number of newly arrived emails received at this time as the total number of newly arrived emails.

In addition, the CPU 120 acquires the total number of unread emails in the email app, and the numbers of newly arrived emails and unread emails for each individual folder set in the email app. At this time, the CPU 120 also acquires the current date and time (i.e., the date and time of acquisition of newly arrived emails) from a timing section (not shown) such as a timer.

Then, the CPU 120 sets the total number of newly arrived emails, the total number of unread emails, the numbers of newly arrived emails and unread emails for each individual folder, the date and time of acquisition of newly arrived emails, and the like thus acquired, as new arrivals overview information for the email app. Then, the CPU 120 registers the new arrivals overview information into the new arrivals overview information database held in the storage section 128, and transfers to the next step SP5.

On the other hand, if a negative result is obtained in step SP3 as a result of not notifying the user of new arrivals overview information for the email app, at this time, the CPU 120 does not register the new arrivals overview information into the new arrivals overview information database, and transfers to the next step SP5.

In step SP5, the CPU 120 determines whether or not to terminate the execution of the email app in the background. For example, the CPU 120 is configured to determine to terminate the execution of the email app in the background in cases such as when an instruction for operation in the power saving mode is given by the user via the first touch panel 104B or the second touch panel 105B.

If a negative result is obtained in this step SP5, at this time, the CPU 120 returns to step SP2, and executes a process of acquiring newly arrived emails again. It should be noted that in the case of a setting that executes a process of acquiring newly arrived emails at an interval of predetermined time (for example, an hour or the like) in the email app, the CPU 120 may execute the process in step SP2 in accordance with this interval.

On the other hand, if a positive result is obtained in step SP5, at this time, the CPU 120 transfers to the next step SP6.

In step SP6, the CPU 120 executes a process of terminating the email app to end this new arrivals overview information registration procedure RT1.

Next, a description will be given of a new arrivals overview information registration procedure for a video purchase app. Since this procedure is substantially the same as the new arrivals overview information registration procedure RT1 described above, specific description of the procedure will be omitted.

Upon starting this new arrivals overview information registration procedure, in steps SP1 and SP2 described above, the CPU 120 executes a video purchase app in the background, and executes a process of acquiring newly arrived information (information about newly arrived videos) for the video purchase app.

Specifically, the CPU 120 transmits an acquisition request for acquiring information about newly arrived videos to a video purchase app server (not shown) that provides various data corresponding to the video purchase app, via the wireless communication section 131. As a result, the CPU 120 receives the information about newly arrived videos via the wireless communication section 131. This information about newly arrived videos includes the title names, jacket photograph images Vp, and the like of newly arrived videos.

Then, in step SP4 described above, the CPU 120 registers the total number of newly arrived videos, the file names of the jacket photograph images Vp of newly arrived videos, and the like, into the new arrivals overview information database as new arrivals overview information for the video purchase app.

Next, a description will be given of a new arrivals overview information registration procedure for an RSS reader. Since this procedure is also substantially the same as the new arrivals overview information registration procedure RT1 described above, specific description of the procedure will be omitted.

Upon starting this new arrivals overview information registration procedure, in steps SP1 and SP2 described above, the CPU 120 executes an RSS reader in the background, and executes a process of acquiring newly arrived information (Web site update information) for the RSS reader.

Specifically, the CPU 120 transmits, to an RSS distribution server (not shown) that distributes update information for each preset Web site in the RSS format, an acquisition request for acquiring the update information, via the wireless communication section 131. As a result, the CPU 120 receives the update information via the wireless communication section 131.

Then, in step SP4 described above, the CPU 120 registers the total number of update information, the total number of unread information, the number of update information and the number of unread information for each individual Web site, and the like, into the new arrivals overview information database as new arrivals overview information for the RSS reader.

Through the new arrivals overview information registration procedure as described above, the portable terminal 100 is configured to acquire new arrivals overview information for each app, and registers this new arrivals overview information into the new arrivals overview information database.

It should be noted that as for the process of acquiring newly arrived information for each app in step SP2 described above, the CPU 120 may execute this process in accordance with the frequency of acquisition of newly arrived information which is set in each app. For example, if the process of acquiring update information is set to be executed at an interval of predetermined time (for example, one hour) in the RSS reader, the CPU 120 may execute the process in step SP2 in accordance with the interval.

As for the process of determining whether or not to notify the user of new arrivals overview information in step SP3 described above, the CPU 120 may make this determination in accordance with determination criteria unique to individual apps.

As for the process of determining whether or not to terminate execution of an app in step SP5 described above, the CPU 120 may change the determination in accordance with the frequency of update of newly arrived information in each app. For example, with respect to an app for which the frequency of update of newly arrived information is equal to a predetermined period of time or more, the CPU 120 may determine to terminate execution of the app in step SP5 at all times.

[1-5-2. New Arrivals Icon Display Procedure]

Next, a description will be given of the operation procedure when the portable terminal 100 displays a new arrivals icon Ni (this will be also referred to as new arrivals icon display procedure).

This new arrivals icon display procedure is a procedure executed by the CPU 120 in accordance with a program written in the ROM 121 or the storage section 128.

Figure 10:
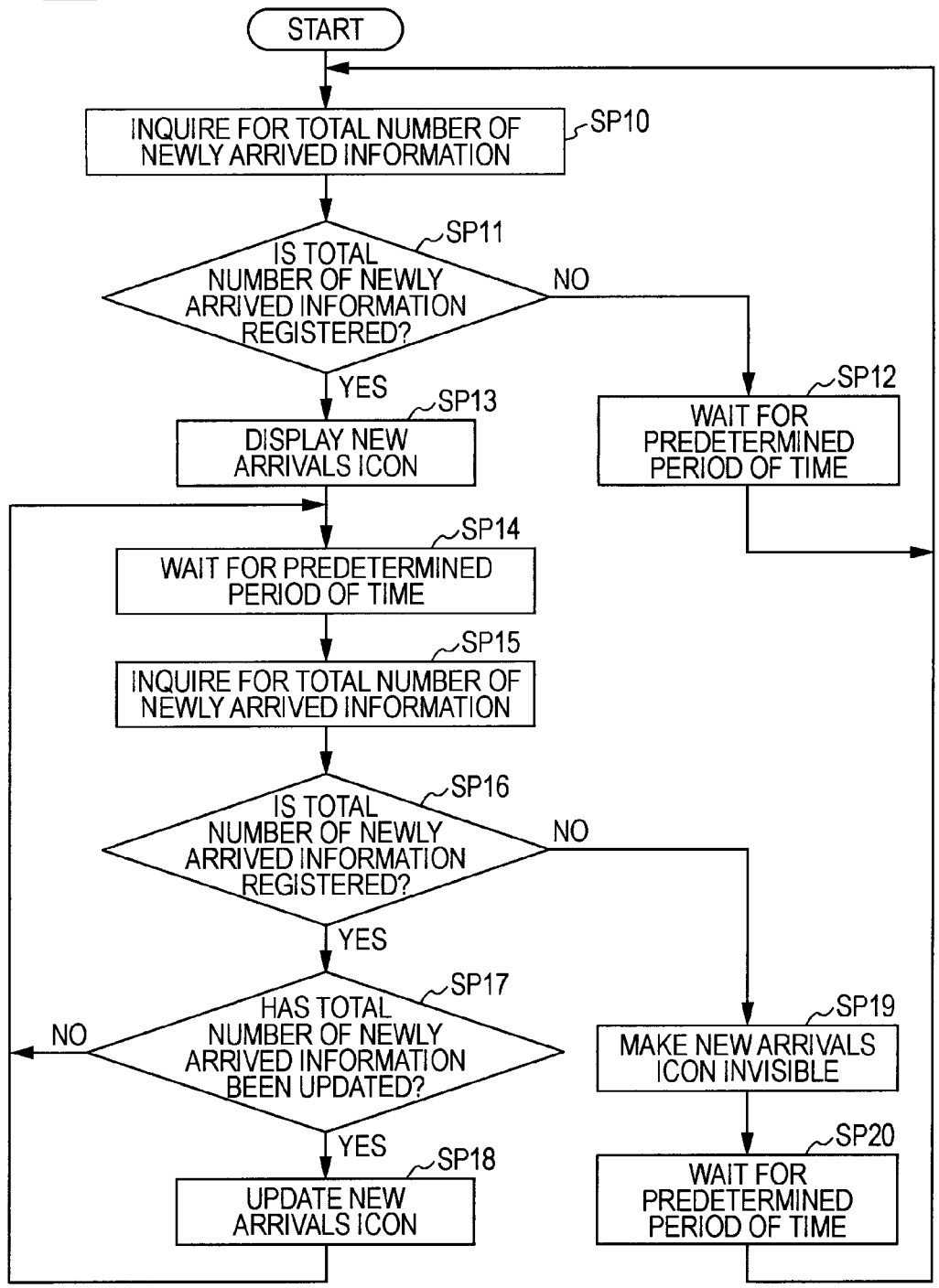
FIG. 10 is a flowchart showing a new arrivals icon display procedure.
Figure 11:
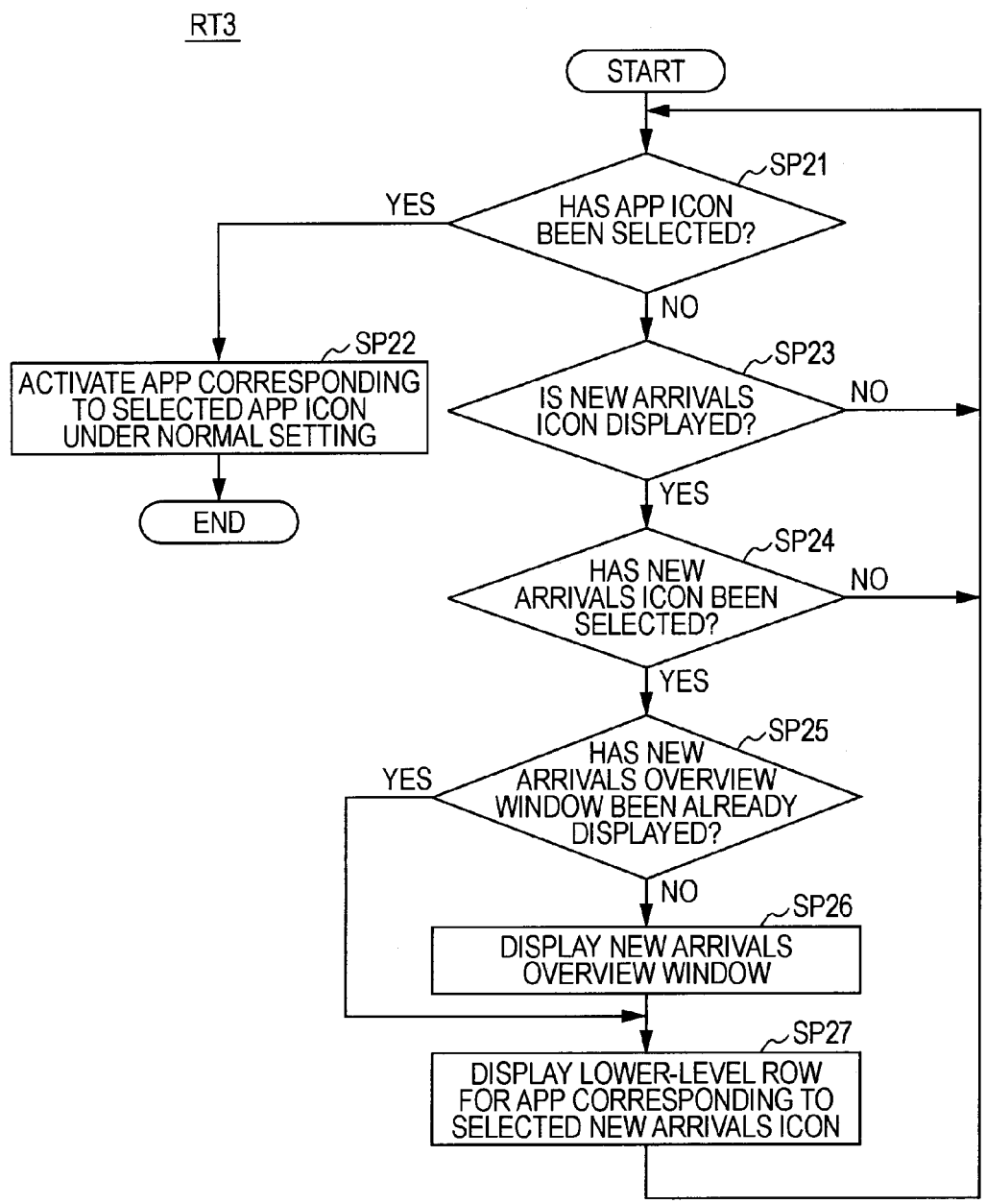
FIG. 11 is a flowchart showing an icon selection procedure.

This new arrivals icon display procedure is executed for every new arrivals icon Ni corresponding to each app. Hereinbelow, for example, a new arrivals icon display procedure RT2 for the new arrivals icon Ni3 (FIG. 4) corresponding to an email app will be described with reference to FIG. 10.

When the CPU 120 is instructed to display the second home screen Hg2 upon turning-on of the power of the portable terminal 100, the CPU 120 starts the new arrivals icon display procedure RT2, and transfers to step SP10.

In step SP10, the CPU 120 inquires the new arrivals overview information database held in the storage section 128 for the total number of newly arrived information (i.e., newly arrived emails) for the email app, and transfers to the next step SP11.

In step SP11, the CPU 120 determines whether or not the total number of newly arrived information for the email app is registered in the new arrivals overview information database.

If a negative result is obtained in step SP11, this means that new arrivals overview information for the email app is not to be notified. At this time, the CPU 120 transfers to step SP12.

In step SP12, the CPU 120 does not display the new arrivals icon Ni3, and after waiting for a predetermined period of time (for example, about several seconds), returns to step SP10, and inquires the new arrivals overview information database for the total number of newly arrived information for the email app again.

On the other hand, if a positive result is obtained in step SP11, this means that new arrivals overview information for the email app is to be notified. At this time, the CPU 120 transfers to the next step SP13.

In step SP13, the CPU 120 displays the new arrivals icon Ni3, which indicates the total number of newly arrived information for the email app, on the upper right of the app icon Ai3 corresponding to the email app, and transfers to the next step SP14.

In step SP14, the CPU 120 waits for a predetermined period of time (for example, about several seconds) while keeping the new arrivals icon Ni3 displayed, and transfers to the next step SP15.

In step SP15, the CPU 120 inquires the new arrivals overview information database for the total number of newly arrived information for the email app again, and transfers to the next step SP16.

In step SP16, the CPU 120 determines whether or not the total number of newly arrived information for the email app is registered in the new arrivals overview information database.

If a positive result is obtained in step SP16, this means that new arrivals overview information for the email app is to be notified. At this time, the CPU 120 transfers to the next step SP17.

In step SP17, the CPU 120 determines whether or not the total number of newly arrived information has been updated. That is, the CPU 120 determines whether or not the total number of newly arrived information currently displayed as the new arrivals icon Ni3 differs from the total number of newly arrived information registered in the new arrivals overview information database.

If a positive result is obtained in this step SP17, the CPU 120 transfers to step SP18. In step SP18, the CPU 120 updates the currently displayed new arrivals icon Ni3 so as to indicate the total number of newly arrived information registered in the new arrivals overview information database, and returns to step SP14.

On the other hand, if a negative result is obtained in step SP17 as a result of the total number of newly arrived information not having been updated, at this time, the CPU 120 returns to step SP14 while keeping the currently displayed new arrivals icon Ni3 displayed.

If a negative result is obtained in step SP16, this means that new arrivals overview information for the email app is not to be notified. At this time, the CPU 120 transfers to step SP19.

In step SP19, the CPU 120 makes the new arrivals icon Ni3 invisible, and transfers to the next step SP20.

In step SP20, the CPU 120 waits for a predetermined period of time (for example, about several seconds), and returns to step SP10.

Through the new arrivals icon display procedure RT2 described above, the portable terminal 100 is configured to display the new arrivals icon Ni3 indicating the total number of newly arrived information for the email app.

It should be noted that since the new arrivals icon display procedures for the new arrivals icon Ni1 corresponding to the video purchase app and the new arrivals icon Ni2 corresponding to the RSS reader are substantially the same as the new arrivals icon display procedure RT2 described above, description thereof is omitted.

The predetermined period of wait time in each of steps SP12, SP14, SP18, and SP20 described above may be, for example, about several minutes, or may be varied in accordance with, for example, the frequency of update of newly arrived information in each app.

[1-5-3. Icon Selection Procedure]

Next, a description will be given of an operation procedure RT3 of the portable terminal 100 when an app icon Ai or new arrivals icon Ni is selected (this will be also referred to as icon selection procedure).

This icon selection procedure RT3 is a procedure executed by the CPU 120 in accordance with a program written in the ROM 121 or the storage section 128.

Upon displaying the second home screen Hg2, for example, the CPU 120 starts the icon selection procedure RT3, and transfers to step SP21.

In step SP21, the CPU 120 determines whether or not an app icon Ai has been selected via the second touch panel 105B.

If a positive result is obtained in this step SP21, at this time, the CPU 120 transfers to the next step SP22. In step SP22, the CPU 120 activates an app corresponding to the selected app icon Ai under normal setting (i.e., initially displays the top screen of the app), and ends this icon selection procedure RT3.

On the other hand, if a negative result is obtained in this step SP21, the CPU 120 transfers to the next step SP23. In step SP23, the CPU 120 determines whether or not a new arrivals icon Ni is displayed on the second home screen Hg2.

If a negative result is obtained in this step SP23, at this time, the CPU 120 returns to step SP21, and determines again whether or not an app icon Ai has been selected.

On the other hand, if a positive result is obtained in step SP23, at this time, the CPU 120 transfers to step SP24.

In step SP24, the CPU 120 determines whether or not a new arrivals icon Ni has been selected via the second touch panel 105B.

If a negative result is obtained in this step SP24, this means that neither an app icon Ai nor a new arrivals icon Ni has been selected. At this time, the CPU 120 returns to step SP21. Then, the CPU 120 repeats steps SP21, SP23, and SP24 until either an app icon Ai or a new arrivals icon Ni is selected.

On the other hand, if a positive result is obtained in step SP24, the CPU 120 transfers to the next step SP25. In step SP25, the CPU 120 determines whether or not the new arrivals overview window Nw has already been displayed on the first liquid crystal panel 104A. That is, the CPU 120 determines whether or not the new arrivals overview display program is currently active.

If a negative result is obtained in this step SP25, at this time, the CPU 120 transfers to the next step SP26.

In step SP26, the CPU 120 activates the new arrivals overview display program, and generates the new arrivals overview window Nw on the basis of new arrivals overview information registered in the new arrivals overview information database. Then, the CPU 120 displays the new arrivals overview window Nw on the first liquid crystal panel 104A, and transfers to the next step SP27.

On the other hand, if a positive result is obtained in step SP25, the CPU 120 transfers to the next step SP27 while keeping the new arrivals overview window Nw displayed.

In step SP27, the CPU 120 moves the upper-level row Lu for an app corresponding to the selected new arrivals icon Ni to the top of the new arrivals overview window Nw for display. At the same time, the CPU 120 displays the lower-level row Ld for the app corresponding to the selected new arrivals icon Ni, and also makes lower-level rows Ld for apps other than this app invisible and then returns to step SP21.

Through the icon selection procedure RT3 described above, when an app icon Ai or new arrivals icon Ni is selected via the second touch panel 105B, the portable terminal 100 is configured to execute processing corresponding to each of these icons.

1-6. Operation and Effect

According to the above-mentioned configuration, upon acquiring newly arrived information for a predetermined app, the CPU 120 of the portable terminal 100 is configured to register information showing an overview of the newly arrived information (i.e., new arrivals overview information) into the new arrivals overview information database.

Then, when instructed to display the home screen, the CPU 120 is configured to display an app icon Ai for activating a predetermined app on the second liquid crystal panel 105A.

In addition, when newly arrived information has been acquired in the app, the CPU 120 is configured to read the total number of the newly arrived information from the new arrivals overview information database, and display a new arrivals icon Ni indicating this total number on the second liquid crystal panel 105A so as to partially overlap the app icon Ai.

Thus, the portable terminal 100 can notify the user that newly arrived information has been acquired in the app, as a state change in the app.

In addition, by registering new arrivals overview information for an app in the new arrivals overview information database in this way, the portable terminal 100 can display the new arrivals icon Ni even when the app is not being executed in the background, thereby making it possible to notify the user that newly arrived information has been acquired.

Then, when the new arrivals icon Ni is selected by the user via the second touch panel 105B, the CPU 120 is configured to activate the new arrivals overview display program for displaying new arrivals overview information corresponding to the app. Then, the CPU 120 is configured to read new arrivals overview information for the app from the new arrivals overview information database, and display the new arrivals overview window Nw showing this new arrivals overview information on the first liquid crystal panel 104A.

Thus, the portable terminal 100 allows the user to check an overview of newly arrived information for the app by merely making the user perform a simple operation of selecting the new arrivals icon Ni via the second touch panel 105B.

In addition, when the lower-level row Ld indicating new arrivals overview information for the app is selected via the second touch panel 105B, the CPU 120 is configured to activate the app, and initially display a screen showing various information related to newly arrived information in the app.

Thus, by merely making the user perform a simple operation of selecting the lower-level row Ld via the second touch panel 105B, the portable terminal 100 allows the user to activate the app and also check details about newly arrived information in the app.

In addition, the CPU 120 is configured to display app icons Ai and new arrivals icons Ni for a plurality of apps on the second liquid crystal panel 105A. Then, when a new arrivals icon Ni is selected via the second touch panel 105B, the CPU 120 is configured to activate the new arrivals overview display program for displaying new arrivals overview information for the plurality of apps, and display the new arrivals overview window Nw on the first liquid crystal panel 104A.

Thus, the portable terminal 100 can display new arrivals overview information for a plurality of apps by merely activating the new arrivals overview display program, even without activating the plurality of apps. Therefore, the portable terminal 100 allows the user to check new arrivals overview information for a plurality of apps, without making the user wait for activation of the plurality of apps.

In addition, since the CPU 120 is configured to display the app icons Ai and the new arrivals icons Ni, and the new arrivals overview window Nw on different screens in this way, it is possible to prevent the app icons Ai and the new arrivals icons Ni from being hidden by the new arrivals overview window Nw.

Thus, the portable terminal 100 can notify the user which new arrivals icon Ni is currently selected. Thus, the portable terminal 100 also allows the user to select an app icon Ai without performing an operation of closing the new arrivals overview window Nw.

According to the above-described configuration, the portable terminal 100 displays an app icon Ai for activating a predetermined app on the second liquid crystal panel 105A. In addition, upon detecting that newly arrived information has been acquired in the app, the portable terminal 100 is configured to display on the second liquid crystal panel 105A a new arrivals icon Ni for indicating the total number of the newly arrived information and displaying new arrivals overview information for the app.

Thus, the portable terminal 100 can notify the user that newly arrived information has been acquired in the app, and also allows the user to check the new arrivals overview information by merely making the user perform a simple operation of selecting the new arrivals icon Ni via the second liquid crystal panel 105A. In this way, the portable terminal 100 can improve the ease of operation when making the user check the new arrivals overview information.

2. Second Embodiment

2-1. Overview of Second Embodiment

Next, a second embodiment will be described. After describing this overview, the description will move on to a specific example of this embodiment.

Figure 12:
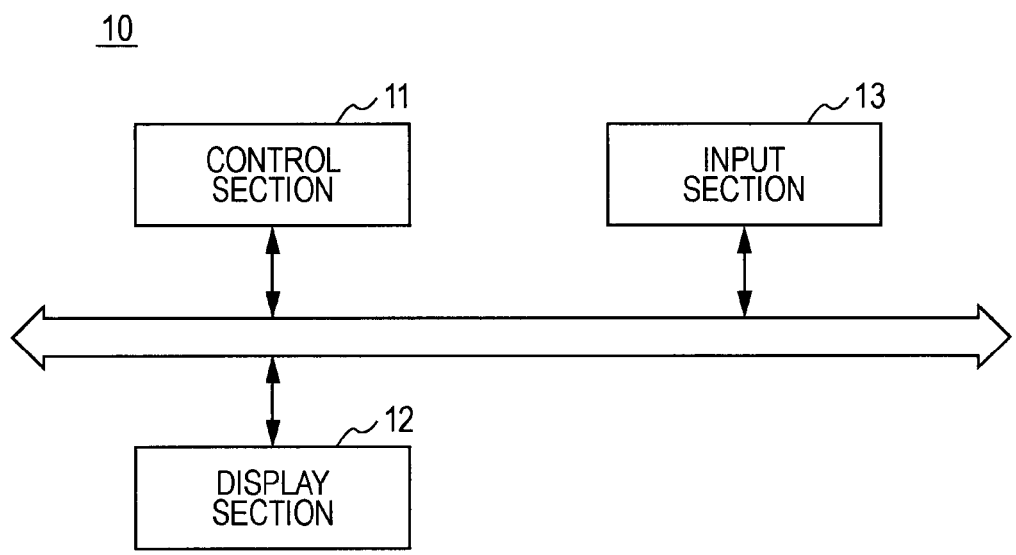
FIG. 12 is a functional block diagram showing an overview of a second embodiment.

In FIG. 12, reference numeral 10 denotes an information processing apparatus according to the second embodiment. The information processing apparatus 10 has a control section 11. The control section 11 may comprise a controller, such as a computer, processor and memory, etc. The control section 11 is configured to display on a display section 12 a first icon for activating a predetermined application.

In addition, upon detecting a state change in the application, the control section 11 is configured to display on the display section 12 a second icon for indicating the state change and also displaying information related to the state change.

Further, when the second icon is selected via an input section 13, the control section 11 is configured to display information related to the state change while keeping the first icon and the second icon displayed.

A specific example of the information processing apparatus 10 configured as described above will be described in detail below.

2-2. Exterior Configuration of Portable Terminal

Figure 13:
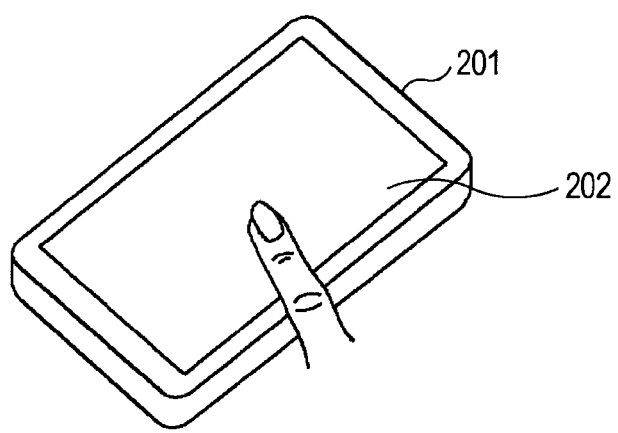
FIG. 13 is a schematic diagram showing the exterior configuration of a portable terminal according to the second embodiment.

Next, referring to FIG. 13, a description will be given of the exterior configuration of a portable terminal 200 representing a specific example of the information processing apparatus 10 described above.

The portable terminal 200 has a casing 201 having a substantially flat rectangular shape of such a size that allows it to be held in one hand.

A touch screen 202 having a rectangular shape is provided at the central portion of a front surface 201A of the casing 201. The touch screen 202 is a display device allowing a touch operation with a user's finger (a pen or the like may be also used). The portable terminal 200 is to be used by the user with the longitudinal direction and lateral direction of the touch screen 202 serving as the up/down direction and the left/right direction, respectively, for example.

2-3. Hardware Configuration of Portable Terminal

Figure 3:
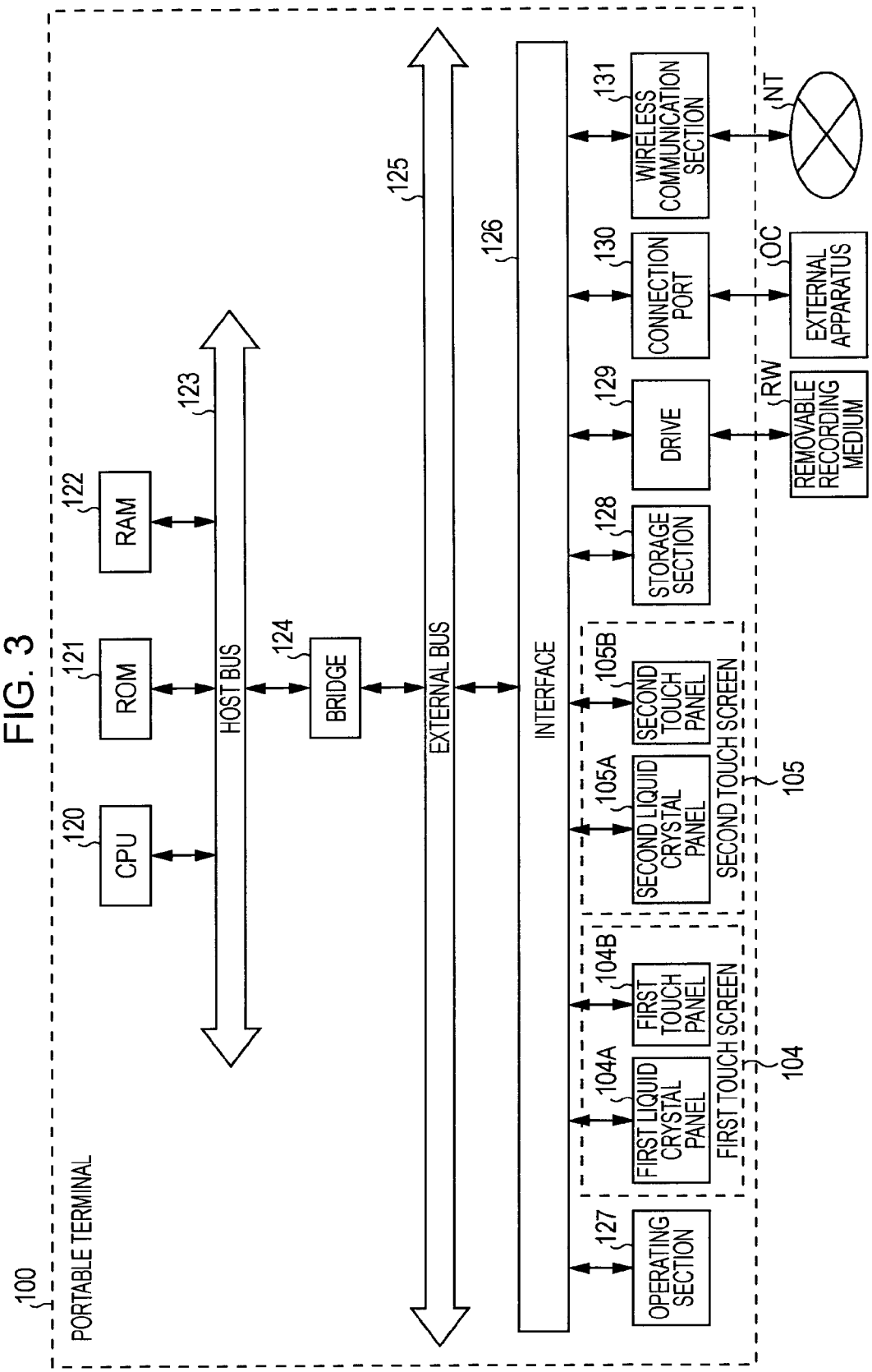
FIG. 3 is a block diagram showing the hardware configuration of the portable terminal according to the first embodiment.
Figure 14:
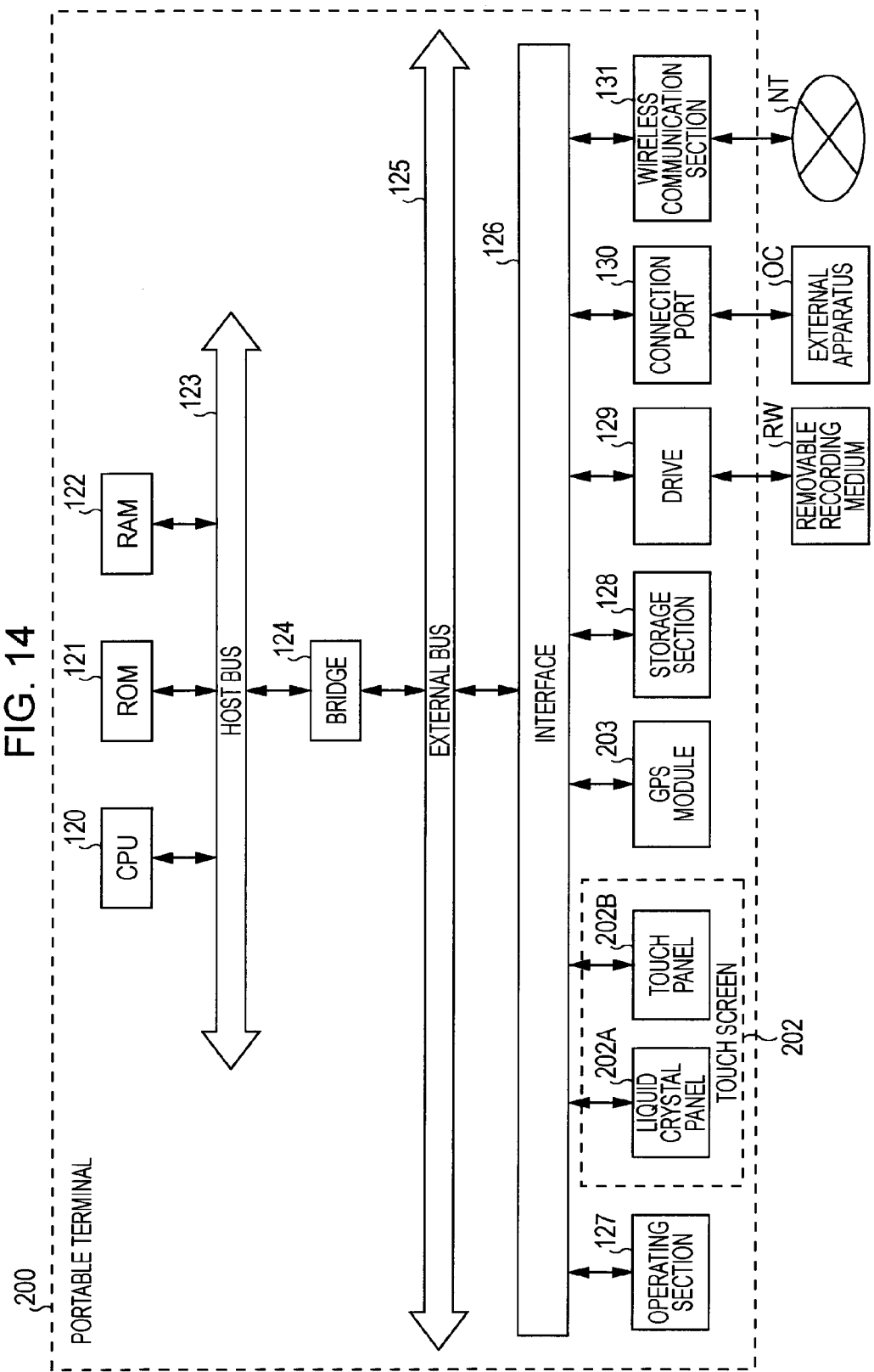
FIG. 14 is a block diagram showing the hardware configuration of the portable terminal according to the second embodiment.

The hardware configuration of the portable terminal 200 will be described below with reference to FIG. 14 in which portions corresponding to those in FIG. 3 are denoted by the same reference numerals. It should be noted that description is omitted with respect to portions similar to those of the portable terminal 100 according to the first embodiment.

An external bus 125 of the portable terminal 200 is connected to a liquid crystal panel 202A, a touch panel 202B, a GPS (Global Positioning System) module 203, and the like via the interface 126.

The CPU 120 is configured to control individual sections in response to an input signal from the touch panel 202B which is sequentially sent via the interface 126, the external bus 125, and the host bus 123.

The touch panel 202B is a device that constitutes the above-described touch screen 202 together with the liquid crystal panel 202A. The touch panel 202B sends an input signal indicating the coordinates of a detected touch position to the CPU 120. From this input signal, the CPU 120 is configured to determine what kind of touch operation has been made to which position on the screen of the liquid crystal panel 202A.

Under the control of the CPU 120, the GPS module 203 receives signals from a plurality of GPS satellites, and measures the current position (latitude, longitude, and the like) of the portable terminal 200 on the basis of the signals. Then, the GPS module 203 is configured to send current position information indicating this current position to the CPU 120.

2-4. Home Screen

Next, a description will be given of a home screen which is one of screens of the portable terminal 200. The home screen is a GUI screen displayed by a display control performed by the CPU 120.

Figure 15:
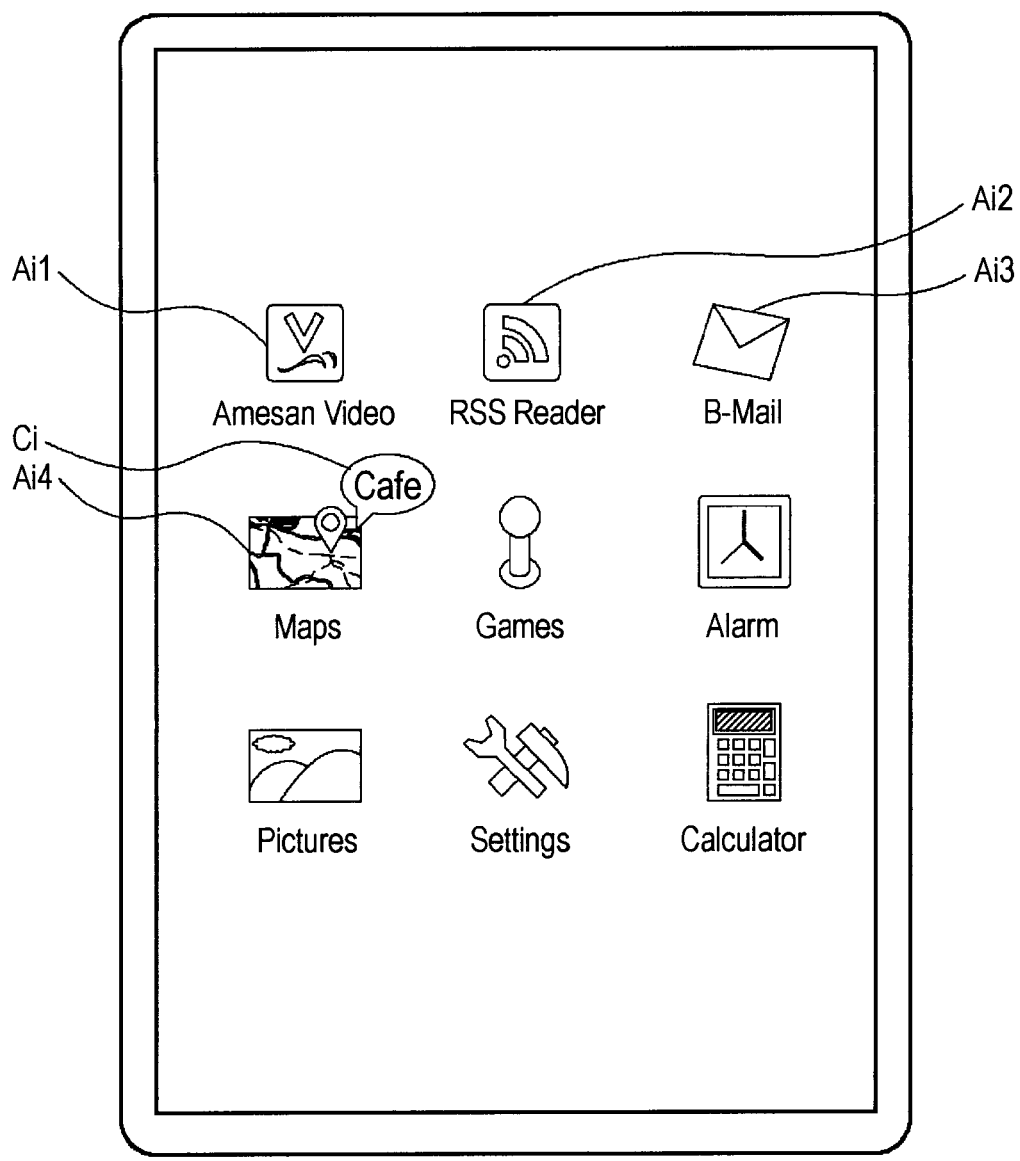
FIG. 15 is a schematic diagram used for explaining a home screen (1) according to the second embodiment.

When a power button (not shown) is depressed and the power of the portable terminal 200 is turned on, as shown in FIG. 15, the CPU 120 causes a home screen Hg to be displayed on the liquid crystal panel 202A.

On the home screen Hg, as in the first embodiment described above, a plurality of app icons Ai for activating predetermined apps are displayed at predetermined intervals in matrix arrangement.

On the home screen Hg shown in FIG. 15, in addition to the app icons Ai1 to Ai3 described above, for example, an app icon Ai4 for activating a map app is displayed.

When a tap operation on an app icon Ai is performed by the user via the touch panel 202B, the CPU 120 recognizes that the app icon Ai has been selected.

Then, as in the first embodiment described above, the CPU 120 activates an app corresponding to the app icon Ai, and initially displays the top screen of the app. That is, when an app icon Ai is selected, the CPU 120 activates the corresponding app under normal setting.

On the home screen Hg, when information about cafes located near the current position of the portable terminal 200 is acquired in the map app, a cafe icon Ci indicating the presence of information about cafes is displayed. The cafe icon Ci is the same pop-up type icon as the above-described new arrivals icon Ni, for example, and is displayed on the upper right of the app icon Ai4 in such a way that the cafe icon Ci partially overlaps the app icon Ai4.

A detailed description will be given of display of this cafe icon Ci. For example, when the power of the portable terminal 200 is turned on, the CPU 120 executes a map app in the background. Then, the CPU 120 executes a process of acquiring cafe information every predetermined period of time (for example, every several minutes). In this case, with cafes present within a range of, for example, 300 (m) from the current position of the portable terminal 200 as nearby cafes, the map app is set to acquire information about the nearby cafes.

In the process of acquiring information about nearby cafes, the CPU 120 acquires current position information from the GPS module 203. Then, the CPU 120 transmits an acquisition request for acquiring information about nearby cafes and the current position information to a map app server (not shown) that provides various data corresponding to the map app, via the wireless communication section 131. As a result, the CPU 120 receives the information about nearby cafes via the wireless communication section 131.

Then, the CPU 120 determines whether or not there are nearby cafes, on the basis of the received information about nearby cafes. Then, if it is determined that there are nearby cafes, the CPU 120 stores "Cafe" into the storage section 128 as information indicating the presence of nearby cafes (this will be also referred to as cafe presence information).

It should be noted that the CPU 120 does not store cafe presence information into the storage section 128 if it is determined that there are no nearby cafes. At this time, if cafe presence information is already stored in the storage section 128, the CPU 120 is configured to delete this cafe presence information from the storage section 128.

Then, while the home screen Hg is being displayed, the CPU 120 inquires the storage section 128 for cafe presence information for the map app every predetermine period of time (for example, every several minutes). Then, if the cafe presence information is stored in the storage section 128, the CPU 120 is configured to display a cafe icon Ci indicating the cafe presence information on the upper right of the app icon Ai4.

Now, suppose that a long press operation on the cafe icon Ci (an operation of touching a position on the cafe icon Ci, and keeping touching the position for a predetermined period of time or more) is performed via the touch panel 202B.

Figure 16:
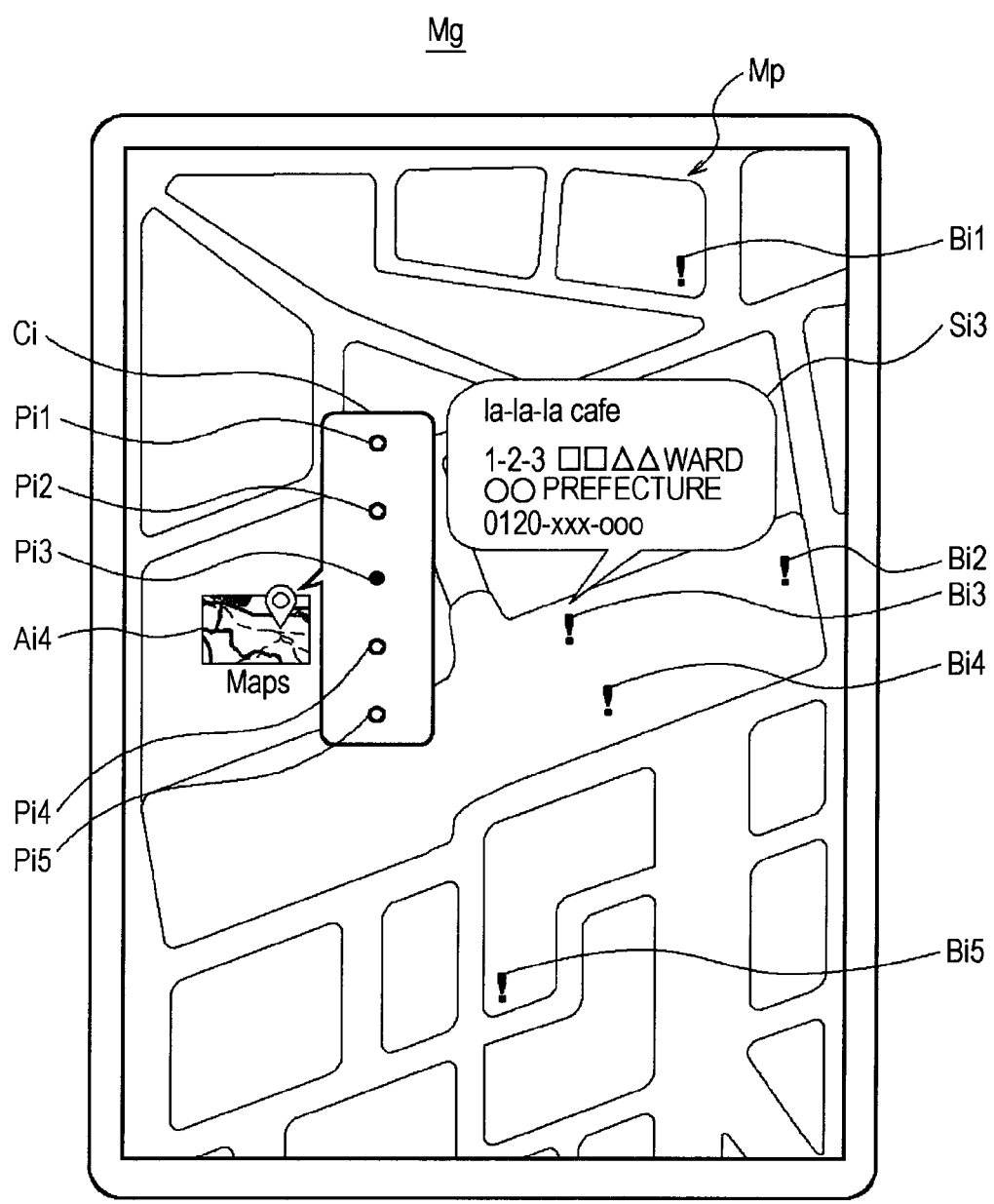
FIG. 16 is a schematic diagram used for explaining a home screen (2) according to the second embodiment.

At this time, the CPU 120 recognizes that the cafe icon Ci has been selected, and activates the map app. Then, as shown in FIG. 16, while keeping the app icon Ai4 and the cafe icon Ci displayed, the CPU 120 displays on the entire liquid crystal panel 202A a map screen Mg showing information about nearby cafes so as not to hide these icons. At this time, the CPU 120 makes icons other than the app icon Ai4 (for example, the app icons Ai1 to Ai3 and the like) invisible.

Specifically, the CPU 120 acquires data of the map image of the vicinity including the current position from the map app server via the wireless communication section 131, and displays a map image Mp based on this data on the entire map screen Mg.

In addition, the CPU 120 displays position icons Bi (Bi1 to Bi5) indicating the positions of individual nearby cafes on the map image Mp, on the basis of the information about nearby cafes acquired from the map app server.

Further, at this time, the CPU 120 displays a details icon Si3 above and near a position icon Bi3 indicating the position of the cafe closest to the current position of the portable terminal 200. The details icon Si3 shows detailed information about the cafe, such as the name, address, and telephone number of the cafe.

Further, at this time, the CPU 120 assigns the cafe icon Ci with a function as an operating button in the map app. Then, the CPU 120 changes the cafe icon Ci into a longitudinally elongated shape, and displays point icons Pi (Pi1 to Pi5) corresponding to individual nearby cafes on the cafe icon Ci. The point icons Pi are displayed while being arranged at predetermined intervals with respect to the up/down direction, for example, and their displayed positions correspond to the positions of individual nearby cafes on the map image Mp.

At this time, if the user has not moved his/her finger from the position where the finger touches the cafe icon Ci, a point icon Pi3 corresponding to the cafe closest to the current position of the portable terminal 200 is selected in this state.

Figure 17:
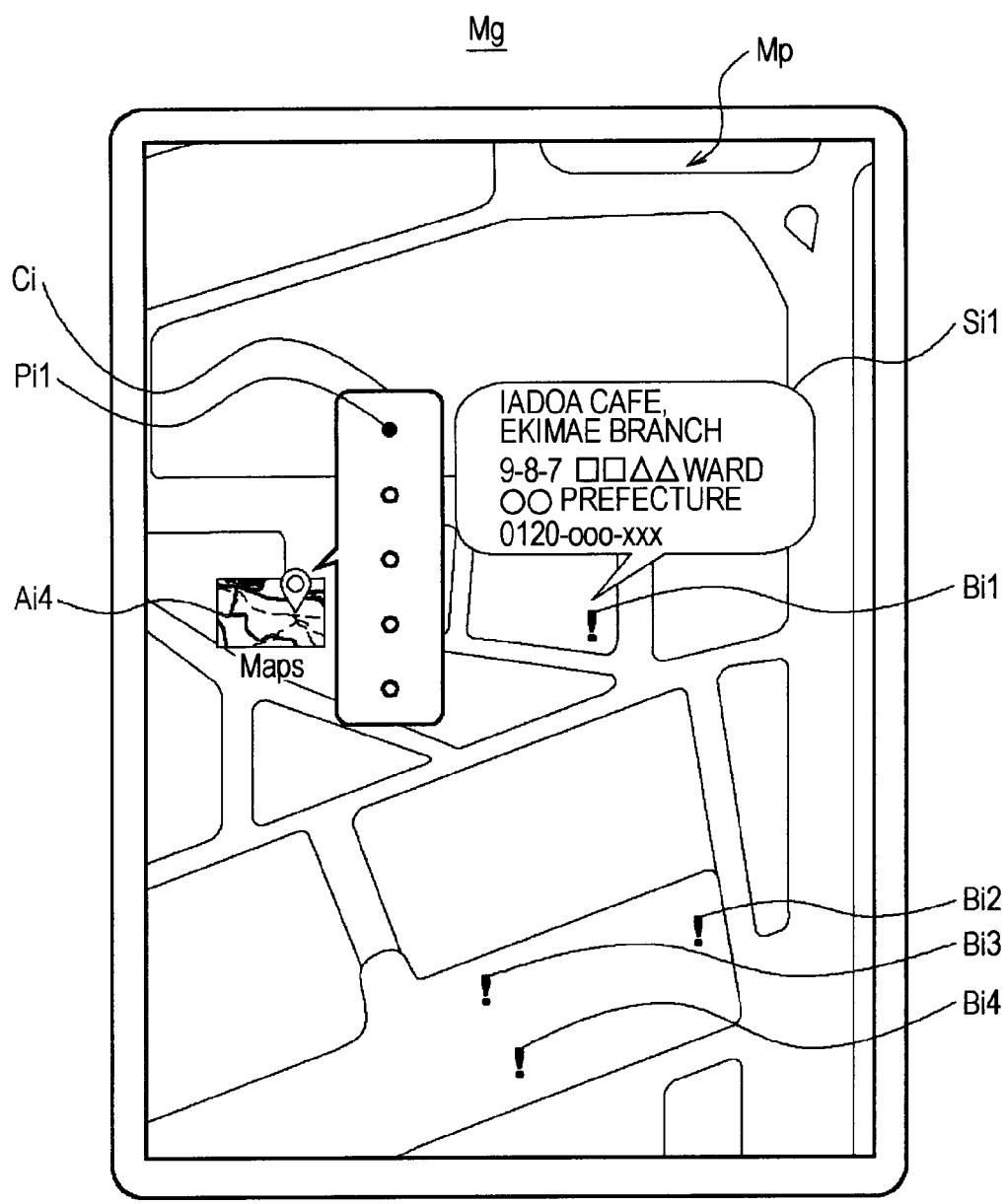
FIG. 17 is a schematic diagram used for explaining a home screen (3) according to the second embodiment.

Now, suppose that, as shown in FIG. 17, the user moves the finger in the upward direction while keeping the finger in touch (i.e., the user performs a drag operation in the upward direction), and touches a point icon Pi1. At this time, the CPU 120 recognizes that the point icon Pi1 has been selected, and scrolls the map image Mp so that a position icon Bi1 indicating the position of the nearby cafe corresponding to the point icon Pi1 is positioned in the vicinity of the center of the map screen Mg. In addition, at this time, the CPU 120 makes the details icon Si3 that has been displayed up to then invisible, and displays a details icon Si1 indicating detailed information about the nearby cafe corresponding to the selected point icon Pi1.

In this way, when a point icon Pi is selected by a drag operation on the cafe icon Ci, the CPU 120 is configured to display detailed information about the nearby cafe corresponding to the selected point icon Pi, in the form of a details icon Si.

Now, suppose that the touch position is moved by the user to a position other than the position of the cafe icon Ci, or that the user's finger is released from the touch panel 202B. Then, the CPU 120 recognizes that the cafe icon Ci has been deselected, and terminates the activation of the map app and displays the home screen Hg after returning the home screen Hg to the original state as shown in FIG. 15.

It should be noted that the CPU 120 of the portable terminal 200 is the hardware implementing the function of the control section 11 of the information processing apparatus 10 described in the overview. In addition, the liquid crystal panel 202A of the portable terminal 200 is the hardware implementing the function of the display section 12 of the information processing apparatus 10. Further, the touch panel 202B of the portable terminal 200 is the hardware implementing the function of the input section 13 of the information processing apparatus 10.

In addition, the app icon Ai4 is the icon corresponding to the first icon described in the overview, and the cafe icon Ci is the icon corresponding to the second icon described in the overview.

2-5. Operation and Effect

According to the above-described configuration, upon acquiring information about nearby cafes in the map app, the CPU 120 of the portable terminal 200 stores information indicating the presence of information about nearby cafes (cafe presence information) into the storage section 128.

At this time, when instructed to display the home screen Hg, the CPU 120 displays the app icon Ai4 for activating the map app on the liquid crystal panel 202A.

In addition, when information about nearby cafes has been acquired in the map app, the CPU 120 reads cafe presence information from the storage section 128, and displays a cafe icon Ci indicating this cafe presence information on the liquid crystal panel 202A so as to partially overlap the app icon Ai4.

Thus, the portable terminal 200 can notify the user that information about nearby cafes has been acquired in the map app, as a state change in the map app.

Further, the CPU 120 activates the map app when the cafe icon Ci is touched by the user via the touch panel 202B. Then, while keeping the cafe icon Ci and the app icon Ai4 displayed, the CPU 120 displays information about nearby cafes acquired in the map app.

Thus, by merely making the user perform a simple operation of selecting the cafe icon Ci via the touch panel 202B, the portable terminal 200 can activate the map app and also allows the user to check information about nearby cafes acquired in the map app.

In addition, by activating the map app while keeping the app icon Ai4 and the cafe icon Ci displayed in this way, the portable terminal 200 can notify the user that the map app is being activated to display information about nearby cafes.

At this time, the CPU 120 assigns the cafe icon Ci with a function as an operating button for performing an operation on the displayed information about nearby cafes. Then, the CPU 120 changes the shape of the cafe icon Ci, and displays point icons Pi corresponding to individual nearby cafes on the cafe icon Ci. When a point icon Pi is selected by a drag operation on the cafe icon Ci, the CPU 120 displays detailed information about the nearby cafe corresponding to the point icon Pi.

Thus, the portable terminal 200 allows the user to check detailed information about nearby cafes as desired by the user, by merely making the user perform a simple operation of performing a drag operation after touching the cafe icon Ci via the touch panel 202.

When the cafe icon Ci is deselected, the CPU 120 terminates the activation of the map app and makes the screen of the map app invisible, and then displays the home screen Hg displaying various app icons Ai.

Thus, the portable terminal 200 can terminate the map app and display the home screen Hg by merely making the user perform a simple operation of deselecting the cafe icon Ci.

According to the above-described configuration, the portable terminal 200 displays the app icon Ai4 for activating the map app on the liquid crystal panel 202A. Upon detecting that information about nearby cafes has been acquired in the map app, the portable terminal 200 is configured to display on the liquid crystal panel 202A a cafe icon Ci for indicating that the information about nearby cafes has been acquired and displaying the information about nearby cafes.

Thus, the portable terminal 200 can notify the user that information about nearby cafes has been acquired in the map app, and allows the user to check the information about nearby cafes by merely making the user perform a simple operation of selecting the cafe icon Ci. In this way, the portable terminal 200 can improve the ease of operation when making the user check the information about nearby cafes.

3. Other Embodiments

3-1. Another Embodiment 1

It should be noted that according to the first embodiment described above, when a new arrivals icon Ni is selected via the second touch panel 105B, the CPU 120 is configured to activate the new arrivals overview display program for displaying new arrivals overview information for an app.

Alternatively, without limitation to the above, when a new arrivals icon Ni is selected, the CPU 120 may activate an app corresponding to the new arrivals icon Ni, and initially display a screen showing information related to newly arrived information.

Figure 18:
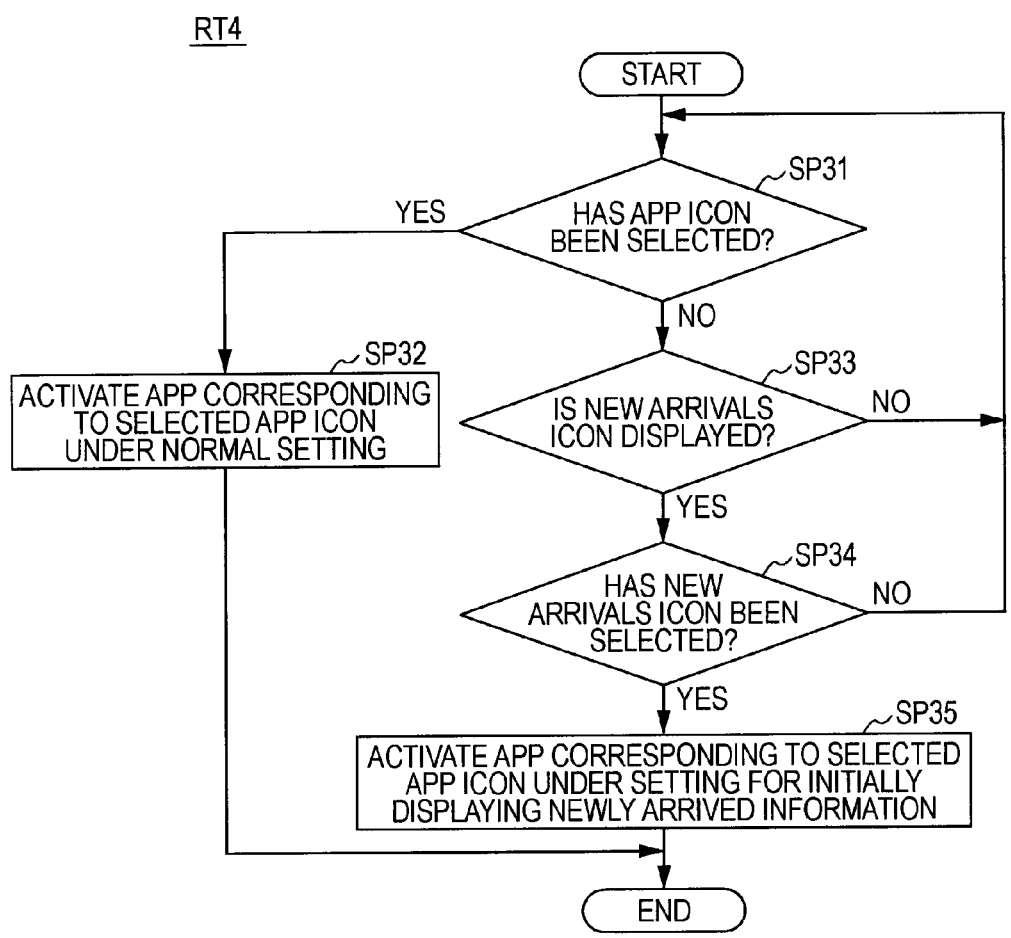
FIG. 18 is a flowchart showing an icon selection procedure according to another embodiment.

An icon selection procedure RT4 in this case will be described with reference to FIG. 18. It should be noted that this icon selection procedure RT4 is a procedure executed by the CPU 120 in accordance with a program written in the ROM 121 or the storage section 128.

Upon displaying the second home screen Hg2, for example, the CPU 120 starts the icon selection procedure RT4, and transfers to step SP31.

In step SP31, the CPU 120 determines whether or not an app icon Ai has been selected via the second touch panel 105B.

If a positive result is obtained in this step SP31, at this time, the CPU 120 transfers to the next step SP32. In step SP32, the CPU 120 activates an app corresponding to the selected app icon Ai under normal setting to initially display the top screen, and ends this icon selection procedure RT4.

On the other hand, if a negative result is obtained in step SP31, the CPU 120 transfers to the next step SP33. In step SP33, the CPU 120 determines whether or not a new arrivals icon Ni is displayed on the second home screen Hg.

If a negative result is obtained in this step SP33, at this time, the CPU 120 returns to step SP31, and determines again whether or not an app icon Ai has been selected.

On the other hand, if a positive result is obtained in step SP33, at this time, the CPU 120 transfers to the next step SP34.

In step SP34, the CPU 120 determines whether or not the new arrivals icon Ni has been selected via the second touch panel 105B.

If a negative result is obtained in this step SP34, this means that neither an app icon Ai nor a new arrivals icon Ni has been selected. At this time, the CPU 120 returns to step SP31. Then, the CPU 120 repeats steps SP31, SP33, and SP34 until either an app icon Ai or a new arrivals icon Ni is selected.

On the other hand, if a positive result is obtained in step SP34, the CPU 120 transfers to the next step SP35. In step SP35, the CPU 120 activates an app corresponding to the selected new arrivals icon Ni under a setting that initially displays a screen showing information related to newly arrived information, and ends the icon selection procedure RT4.

For example, when the new arrivals icon Ni1 (FIG. 4) corresponding to a video purchase app is selected, the CPU 120 activates the video purchase app, and initially displays a list screen showing a list of the title names, sales prices, and the like of newly arrived videos.

In addition, for example, when the new arrivals icon Ni2 corresponding to an RSS reader is selected, the CPU 120 activates the RSS reader, and initially displays a list screen showing a list of the title names and the like of update information for each Web site.

In addition, for example, when the new arrivals icon Ni3 corresponding to an email app is selected, the CPU 120 activates the email app, and initially displays a list screen showing a list of the titles, senders, and the like of newly arrived emails.

In this way, when a new arrivals icon Ni is selected, the portable terminal 100 activates an app corresponding to the selected new arrivals icon Ni, and initially displays information related to newly arrived information for the app. Thus, by merely making the user perform a simple operation of selecting a new arrivals icon Ni, the portable terminal 100 can activate an app corresponding to the new arrivals icon Ni and allows the user to check information related to newly arrived information for the app.

3-2. Another Embodiment 2

According to the first embodiment described above, when newly arrived information is acquired in an app, the CPU 120 is configured to display, on the upper right of an app icon Ai, a new arrivals icon Ni for indicating the total number of newly arrived information and displaying new arrivals overview information.

Alternatively, without limitation to the above, the CPU 120 may detect various other kinds of state change as long as such a state change is a state change in an app. Further, the CPU 120 may display, together with an app icon Ai, various other kinds of icon as long as such an icon is an icon for indicating a state change in an app and displaying information related to the state change. In addition, the shape, size, display position, and the like of such an icon are not limited to those described above either. Icons in various other shapes, sizes, display positions, and the like may be displayed.

Figure 19:
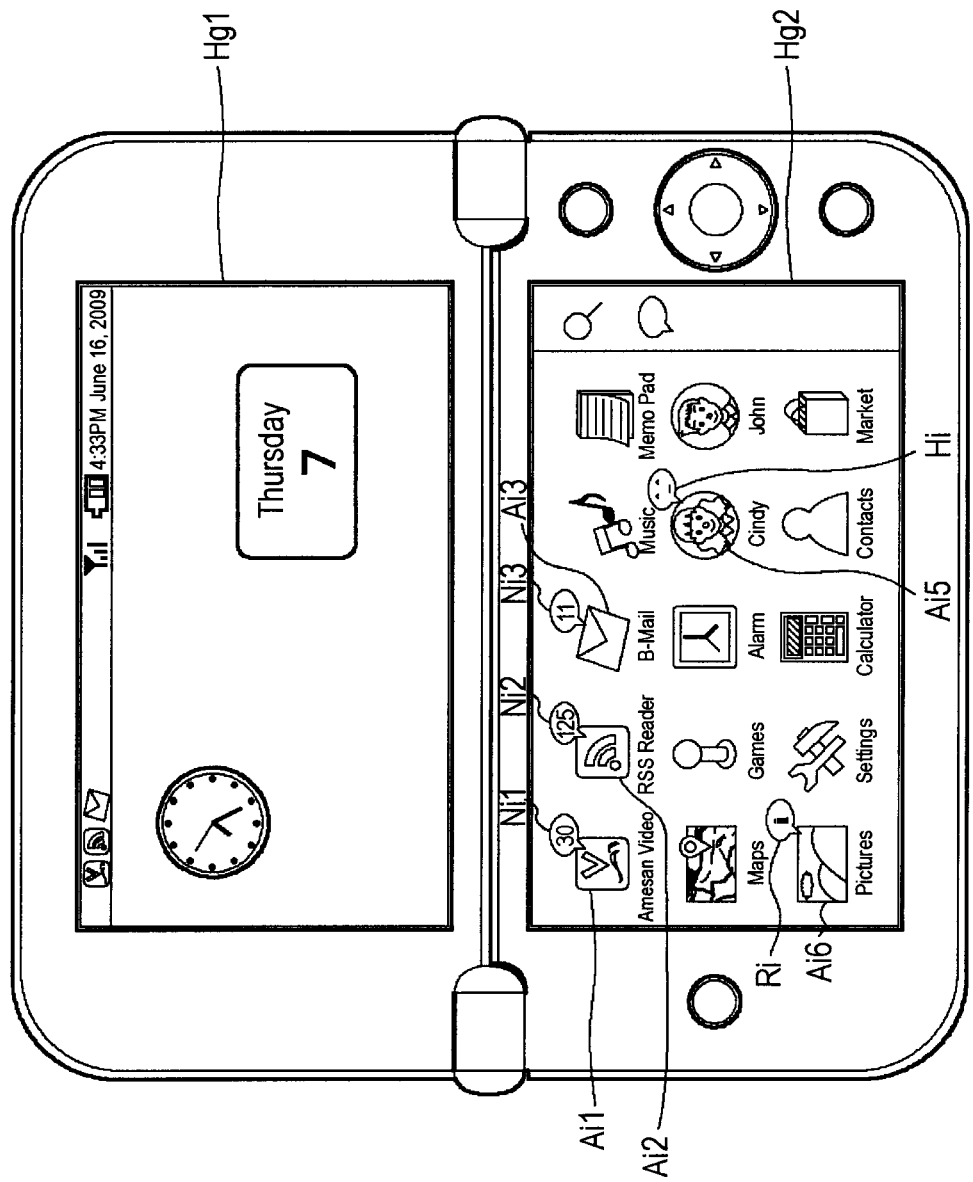
FIG. 19 is a schematic diagram used for explaining a home screen (1) according to another embodiment.

For example, as shown in FIG. 19, the CPU 120 displays on the second home screen Hg2 an app icon Ai5 for activating an app for displaying a blog article of an arbitrary person "Cindy" (this will be also referred to as blog app).

At this time, if the CPU 120 detects acquisition of a newly arrived article in the blog app, the CPU 120 may display a feeling icon Hi indicating the feeling of "Cindy" about the newly arrived article (for example, an emoticon indicating a happy face), on the upper right of the app icon Ai5.

Then, when the feeling icon Hi is selected via the second touch panel 105, the CPU 120 may activate the blog app, and initially display this newly arrived article.

It is assumed that when, for example, the power of the portable terminal 100 is turned on, the CPU 120 is configured to execute the blog app in the background, and acquire information about newly arrived articles via the wireless communication section 131 from a server that provides information about blog articles. It is assumed that this information about newly arrived articles includes information indicating the feelings of "Cindy" about the newly arrived articles.

In addition, for example, the CPU 120 displays on the second home screen Hg2 an app icon Ai6 for activating an app for browsing an image (this will be also referred to as image browsing app).

At this time, if the CPU 120 detects with respect to the image browsing app that version upgrade information for the image browsing app has been acquired, for example, the CPU 120 may display an information icon Ri indicating the presence of version upgrade information on the upper right of the app icon Ai6.

Then, when the information icon Ri is selected via the second touch panel 105B, the CPU 120 may display on the first liquid crystal panel 104A a screen for notifying the user of information related to a version upgrade for the image browsing app.

In this way, upon acquiring notification information in an app which is to be notified to the user, the CPU 120 may display an icon indicating the presence of notification information, and display the notification information when this icon is selected.

3-3. Another Embodiment 3

Further, according to the first embodiment described above, the CPU 120 is configured to display new arrivals icons Ni (Ni1 to Ni3) corresponding to individual apps in the same shape and size.

Alternatively, without limitation to the above, the CPU 120 may cause a new arrivals icon Ni corresponding to an app with relatively large number of newly arrived information to be displayed in a large size, and cause a new arrivals icon Ni corresponding to an app with relatively small number of newly arrived information to be displayed in a small size.

Alternatively, without limitation to the above, the CPU 120 may display a new arrivals icon Ni in a flashing fashion when newly arrived information particularly recommendable to the user is acquired in an app.

That is, in accordance with a change in the state of an app such as the acquisition status of newly arrived information in the app, the CPU 120 may change the manner of display of an icon indicating the state change such as the new arrivals icon Ni.

Thus, the portable terminal 100 can notify the user of a state change in an app in a more easy to understand way.

3-4. Another Embodiment 4

Further, according to the first embodiment described above, as shown in, for example, FIG. 4, the CPU 120 is configured to display each app icon Ai in a predetermined display position.

Alternatively, without limitation to the above, the CPU 120 may change the display position of each app icon Ai depending on whether or not the app icon Ai is displaying a new arrivals icon Ni corresponding to the app icon Ai.

For example, the CPU 120 may display each app icon Ai that is displaying a new arrival icon Ni, in the leftmost column or rightmost column of the columns of app icons Ai on the second home screen Hg2.

Figure 20:
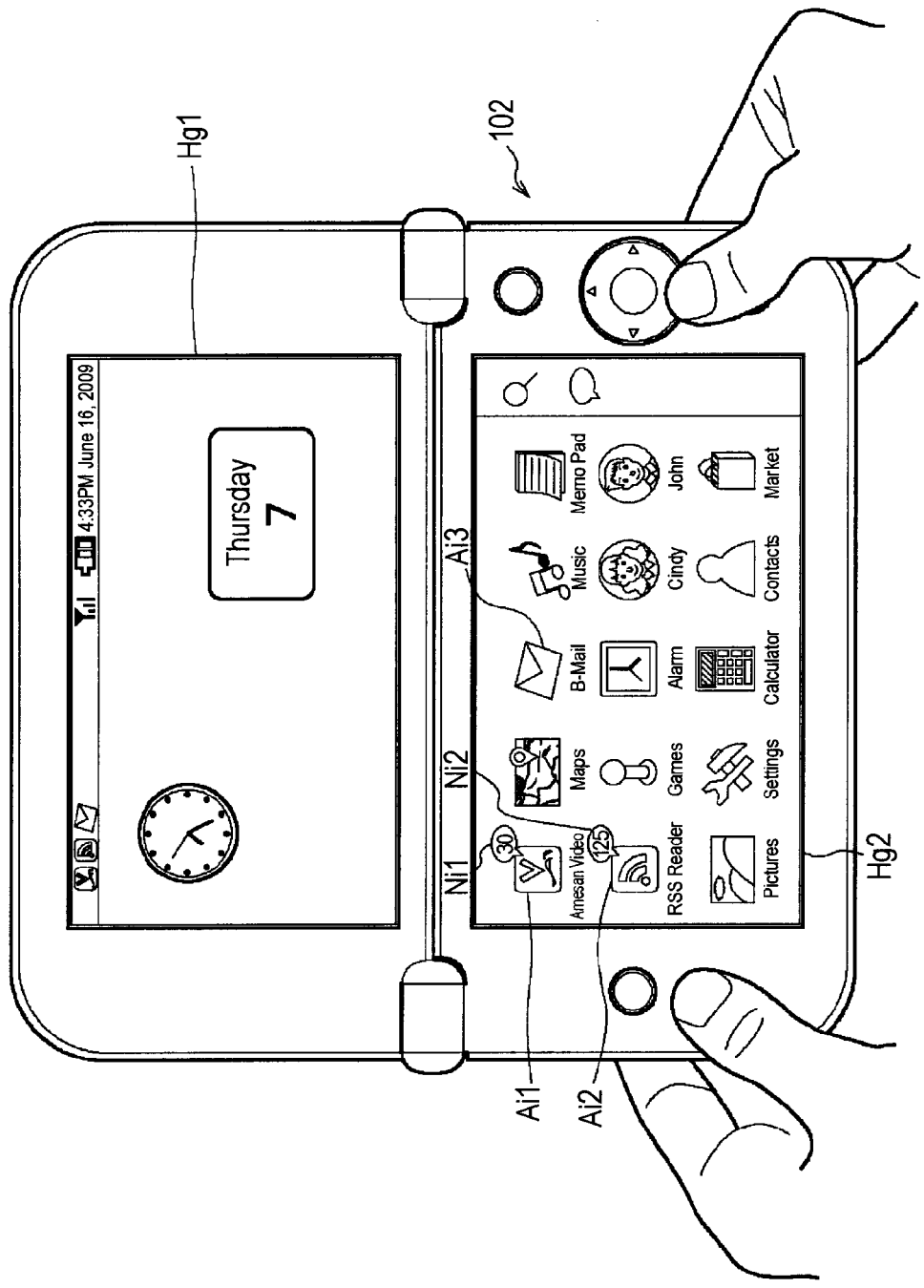
FIG. 20 is a schematic diagram used for explaining a home screen (2) according to another embodiment.

For example, in FIG. 20, since newly arrived information has been acquired in the video purchase app and the RSS reader, the new arrivals icons Ni1 and Ni2 are displayed, respectively. Since no newly arrived information has been acquired in the email app, the new arrivals icon Ni3 is not displayed.

At this time, the CPU 120 displays the app icon Ai1 corresponding to the video purchase app and the app icon Ai2 corresponding to the RSS reader in the leftmost column on the second home screen Hg2. On the other hand, the CPU 120 displays the app icon Ai3 corresponding to the email app in, for example, the column at the middle of the second home screen Hg2.

It is expected that when using the portable terminal 100, the user holds the second casing 102 with both hands. Further, it is expected that the region on the second touch screen 105 which can be touched by the user with his/her finger while holding the second casing 102 with both hands is either the rightmost region or the leftmost region of the second touch screen 105.

Therefore, it is considered that the user can easily select a new arrivals icon Ni or an app icon Ai displayed in the rightmost region or leftmost region of the second touch screen 105.

Accordingly, by displaying a new arrivals icon Ni and the corresponding app icon Ai in the rightmost region or leftmost region of the second touch screen 105, the portable terminal 100 makes it easy for the user to select these icons.

That is, the portable terminal 100 displays a new arrivals icon Ni and the corresponding app icon Ai within a region on the second touch screen 105 which can be touched by a finger of the user when the second casing 102 is held with the hands of the user. Thus, the portable terminal 100 can make it easy for the user to select such a new arrivals icon Ni and the corresponding app icon Ai, thereby improving the ease of operation when making the user check new arrivals overview information or other such information related to newly arrived information.

3-5. Another Embodiment 5

Further, according to the first embodiment described above, after a new arrivals icon Ni is selected to display new arrivals overview information, when the new arrivals overview information is selected, the CPU 120 is configured to activate the corresponding app, and initially display a screen showing information related to newly arrived information.

Alternatively, without limitation to the above, for example, when an operation of dragging a selected new arrivals icon Ni to the corresponding app icon Ai is performed, the CPU 120 may activate the corresponding app, and initially display a screen showing information related to newly arrived information.

Thus, by merely making the user perform a simple operation of selecting a new arrivals icon Ni to check new arrivals overview information and then dragging the new arrivals icon Ni to the corresponding app icon Ai, the portable terminal 100 can activate the corresponding app, and allows the user to check information related to newly arrived information. In this way, the portable terminal 100 allows the user to check information related to newly arrived information for an app by a simpler operation.

3-6. Another Embodiment 6

Further, according to the first embodiment described above, the CPU 120 is configured to set new arrivals overview information for an app as having been already checked by the user, when the Checked button Bn on the new arrivals overview window Nw is selected.

Alternatively, without limitation to the above, the CPU 120 may display, for example, a trash icon in the region R3 (FIG. 4) of the second home screen Hg2. Then, when an operation of dragging a new arrivals icon Ni to the trash icon is performed, the CPU 120 may set the corresponding new arrivals overview information as having been already checked by the user, and make the new arrivals icon Ni corresponding to the new arrivals overview information invisible.

That is, the CPU 120 may provide the second home screen Hg2 with a predetermined region for setting new arrivals overview information as having been already checked by the user. Then, when an operation of dragging a new arrivals icon Ni to this region is performed, the CPU 120 may set the corresponding new arrivals overview information as having been already checked by the user, and make the new arrivals icon Ni corresponding to the new arrivals overview information invisible.

Thus, by merely making the user perform a simple operation of selecting a new arrivals icon Ni to check new arrivals overview information and then dragging the new arrivals icon Ni to the predetermined region, the portable terminal 100 can set the new arrivals overview information as having been already checked by the user.

3-7. Another Embodiment 7

Further, according to the first embodiment described above, when a tap operation on a new arrivals icon Ni is performed, the CPU 120 is configured to recognize that the new arrivals icon Ni has been selected, and display the lower-level row Ld for an app corresponding to the new arrivals icon Ni.

Alternatively, without limitation to the above, the CPU 120 may be configured to display the lower-level row Ld for an app corresponding to a new arrivals icon Ni only while the new arrivals icon Ni is being touched continuously, for example.

Alternatively, without limitation to the above, the CPU 120 may be configured to display the new arrivals overview window Nw only while a new arrivals icon Ni is being touched continuously, for example.

Alternatively, without limitation to the above, the CPU 120 may recognize that a new arrivals icon Ni has been selected and display the new arrivals overview window Nw, in response to various other kinds of operation on the new arrivals icon Ni. For example, a hardware button such as an Enter button may be provided as an input section instead of the second touch panel 105B, and a new arrivals icon Ni may be recognized as having been selected in response to a depressing operation on the Enter button.

3-8. Another Embodiment 8

Further, according to the second embodiment described above, when a cafe icon Ci is selected, the CPU 120 is configured to display, on the entire liquid crystal panel 202A, the map screen Mg showing information about nearby cafes while keeping the app icon Ai4 and the cafe icon Ci displayed.

Alternatively, without limitation to the above, the CPU 120 may display the map screen Mg at various other positions, as long as the app icon Ai4 and the cafe icon Ci remain displayed. For example, if the app icon Ai4 and the cafe icon Ci are displayed in the upper side of the liquid crystal panel 202A, the CPU 120 may display the map screen Mg in the lower side of the liquid crystal panel 202A.

3-9. Another Embodiment 9

Further, according to the first embodiment described above, the CPU 120 is configured to inquire the new arrivals overview information database for the total number of newly arrived information every predetermined period of time interval in the new arrivals icon display procedure RT2, and display a new arrivals icon Ni indicating the total number.

Alternatively, without limitation to the above, for example, the CPU 120 may execute a program that displays a new arrivals icon Ni when newly arrived information is acquired in an app, thereby displaying the new arrivals icon Ni indicating the total number of newly arrived information.

Alternatively, without limitation to the above, for example, the CPU 120 may make a new arrivals icon Ni corresponding to newly arrived information invisible as soon as the newly arrived information is checked in an app.

3-10. Another Embodiment 10

Further, according to the second embodiment described above, when a cafe icon Ci is selected, the CPU 120 is configured to assign the cafe icon Ci with a function as an operating button in the map app. Then, the CPU 120 is configured to accept an operational input to information related to information about nearby cafes, on the basis of an operational input to the cafe icon Ci.

Alternatively, without limitation to the above, the CPU 120 may assign the cafe icon Ci with various other kinds of function, as long as the CPU 120 assigns the cafe icon Ci with a function as an operating button for performing an operation on information related to information about nearby cafes. Alternatively, the CPU 120 may change the shape of the cafe icon Ci to various shapes upon assignment of such a function, or may not change the shape. Alternatively, the CPU 120 may accept various operational inputs to information about nearby cafes, in response to various other operational inputs to the cafe icon Ci.

3-11. Another Embodiment 11

Further, according to the first and second embodiments described above, the portable terminal 100 or 200 serving as the information processing apparatus 1 or 10 is provided with the CPU 120 serving as the control section 2 or 12.

Further, according to the other embodiments described above, in addition to the CPU 120 serving as the control section 2, the second casing 102 serving as a casing, and the second touch screen 105 serving as a touch screen are provided to the portable terminal 100 serving as the information processing apparatus 1.

Alternatively, without limitation to the above, the above-described individual sections of the portable terminal 100 or 200 may be configured by various other hardware or software, as long as they have the same functions.

Further, according to the embodiments described above, a touch screen including a liquid crystal panel and a touch panel is provided as the display section and input section of the information processing apparatus. Alternatively, a liquid crystal display having a touch panel function may be provided, for example. Alternatively, for example, a hardware button such as a cross key may be provided instead of the touch panel. Alternatively, for example, an organic EL (Electro Luminescence) display may be provided instead of the liquid crystal panel.

Further, according to the first and second embodiments described above, the present invention is applied to the portable terminal 100 or 200. Alternatively, without limitation to the above, the present invention may or can be applied to various other kinds of information processing apparatus which activate an application, for example, a portable telephone or a PDA (Personal Digital Assistant).

3-12. Another Embodiment 12

Further, according to the embodiments described above, a program for executing various kinds of processing is written in the ROM 121 or the storage section 128 of the portable terminal 100 in advance.

Alternatively, without limitation to the above, this program may be recorded in advance in, for example, a storage medium such as a memory card, and the CPU 120 of the potable terminal 100 may read this program from the storage medium for execution. Alternatively, a flash memory may be provided instead of the ROM 121, and the program read from the storage medium may be installed into this flash memory.

3-13. Another Embodiment 13

Further, the present invention is not limited to the first and second embodiments and the other embodiments described above. That is, the scope of the present invention encompasses embodiments obtained by combining part or all of the first and second embodiments and the other embodiments described above in an arbitrary manner, or embodiments obtained by partially extracting these embodiments.

For example, the first embodiment and Another Embodiment 8 may be combined. In this case, for example, when newly arrived information is acquired in an app in the portable terminal 200 having a single touch screen, a new arrivals icon Ni is displayed adjacent to the corresponding app icon Ai. Then, when the new arrivals icon Ni is selected, the CPU 120 displays the new arrivals overview window Nw at a position not overlapping the app icon Ai and the new arrivals icon Ni while keeping the app icon Ai and the new arrivals icon Ni displayed.

Further, for example, the first embodiment and Another Embodiment 10 may be combined. In this case, for example, when a new arrivals icon Ni is selected by a tap operation in the portable terminal 200 having a single touch screen, the CPU 120 displays the new arrivals overview window Nw showing new arrivals overview information. At the same time, the CPU 120 assigns the new arrivals icon Ni with a function as an operating button for scrolling the new arrivals overview information, and changes the shape of the new arrivals icon Ni to the shape of, for example, a cross button. Then, the CPU 120 may scroll the new arrivals overview information in accordance with an operation on the cross button.

The present application contains subject matter related to that disclosed in Japanese Priority Patent Application JP 2009-200161 filed in the Japan Patent Office on Aug. 31, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

Systems, apparatuses, and methods consistent with this disclosure may be implemented as instructions on a computer-readable medium. A computer-readable medium can be magnetic storage, optical storage, solid state storage, a hard drive, RAM, ROM, CD, DVD, flash drive, or other device suitable for storing computer-readable instructions. The system may be implemented by one or more of the CPUs executing the instructions stored on the computer-readable medium.

What is claimed is:

1. Information processing apparatus, comprising: an input unit configured to:
   receive information associated with a first set of processing instructions;
   a processor configured to:
      generate a first signal to cause a first display object to be presented on a display surface;
      generate a second signal, based on the received information, to cause a second display object to be presented on the display surface, the second display object including a number associated with the received information, wherein the second display object is presented at a location on the display surface based on a location of the first display object at the same time as presentation of the first display object;
      in response to selection of the first display object execute a first process of the first set of processing instructions so as to present a first screen associated with the first set of processing instructions on the display surface; and in response to selection of the second display object, execute a second process of the first set of processing instructions, the second process being different from the first process, so as to present a second screen, which is different from the first screen, and including character information associated with the received information on the display surface.

2. The apparatus of claim 1, wherein:
   the received information comprises one or more unread electronic messages, and
   the number included in the second display object indicates a number of the one or more unread electronic messages.

3. The apparatus of claim 1, wherein:
   the received information comprises a data feed, and
   the second display object indicates a new arrival for the data feed.

4. The apparatus of claim 3, wherein the data feed comprises at least one of an RSS feed, a blog, a social media feed, or a news feed.

5. The apparatus of claim 1, wherein:
   the received information comprises position information, and
   the second display object indicates that at least one of an object or a service is available within a predetermined distance from the apparatus.

6. The apparatus of claim 1, wherein the second display object overlaps at least a portion of the first display object.

7. The apparatus of claim 1, wherein a position of the second display object indicates a relationship between the first and second display objects.

8. The apparatus of claim 1, wherein:
   the display surface comprises a first display surface of the apparatus and a second display surface of the apparatus.

9. The apparatus of claim 8, wherein the circuitry is further configured to, in response to the selection of the second display object on the first display surface, present the character information associated with the received information on the second display surface.

10. The apparatus of claim 1, wherein the number associated with the received information indicates a change to a state of having new data associated with the first set of processing instructions.

11. The apparatus of claim 1, wherein the circuitry is further configured to enlarge the second display object in response to the selection of the second display object.

12. The apparatus of claim 11, wherein the circuitry is further configured to return the second display object to an original size in response to a release of the selection.

13. The apparatus of claim 1, wherein the circuitry is further configured to change a color of the second display object in response to the selection of the second display object.

14. The apparatus of claim 1, wherein the second display object comprises an emoticon indicating a selected feeling of a third party regarding the received information.

15. The apparatus of claim 1, wherein:
   the received information comprises new information associated with the first set of processing instructions; and
   the controller is further configured to determine a size of the second display object based on an amount of new information.

16. The apparatus of claim 1, wherein:
   the received information comprises new information associated with the first set of processing instructions; and
   the controller is further configured to present the new information in response to dragging the second display object to the first display object.

17. The apparatus of claim 1, wherein:
   the selection of the first display object is based on a first touch input on a touch sensitive surface integrated on the display surface, and
   the selection of the second display object is based on a second touch input on the touch sensitive surface.

18. An information processing method, performed via at least one processor, the method comprising:
   receiving information associated with a first set of processing instructions;
   generating a first signal to cause a first display object to be presented on a display surface;
   generating a second signal, based on the received information, to cause a second display object to be presented on the display surface, the second display object including a number associated with the received information, wherein the second display object is presented at a location on the display surface based on a location of the first display object at the same time as presentation of the first display object;
   in response to selection of the first display object, executing a first process of the first set of processing instructions so as to present a first screen associated with the first set of processing instructions on the display surface; and
   in response to selection of the second display object, executing a second process of the first set of processing instructions, the second process being different from the first process, so as to present a second screen, which is different from the first screen, and including character information associated with the received information on the display surface.

19. The method of claim 18, wherein the number included in the second display object indicates a number of new pieces of data associated with the first set of processing instructions.

20. A non-transitory computer-readable medium tangibly embodied in a storage device storing a set of instructions that, when executed by a processor, perform an information processing method, the method comprising:

receiving information associated with a first set of processing instructions;

generating a first signal to cause a first display object to be presented on a display surface;

generating a second signal, based on the received information, to cause a second display object to be presented on the display surface, the second display object including a number associated with the received information, wherein the second display object is presented at a location on the display surface based on a location of the first display object at the same time as presentation of the first display object;

in response to selection of the first display object, executing a first process of the first set of processing instructions so as to present a first screen associated with the first set of processing instructions on the display surface; and selection of the second display object causing execution of a second process of the first set of processing instructions including initially presenting the received information on the display, the second process being different from the first process, so as to present a second screen, which is different from the first screen, and including character information associated with the received information on the display surface.

* * * * *